(12) United States Patent
Xiao

(10) Patent No.: US 8,606,010 B2
(45) Date of Patent: Dec. 10, 2013

(54) IDENTIFYING TEXT PIXELS IN SCANNED IMAGES

(75) Inventor: Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 13/051,223

(22) Filed: Mar. 18, 2011

(65) Prior Publication Data

US 2012/0237116 A1    Sep. 20, 2012

(51) Int. Cl.
*G06K 9/34* (2006.01)

(52) U.S. Cl.
USPC ............. 382/176; 382/103; 382/159; 706/50

(58) Field of Classification Search
USPC .............................. 382/103, 159, 176; 706/50
See application file for complete search history.

(56) References Cited

U.S. PATENT DOCUMENTS

| | | | |
|---|---|---|---|
| 5,212,741 A | 5/1993 | Barski et al. | |
| 5,640,492 A | 6/1997 | Cortes et al. | |
| 6,038,527 A | 3/2000 | Renz | |
| 7,499,588 B2 * | 3/2009 | Jacobs et al. | 382/182 |
| 7,532,755 B2 * | 5/2009 | Thakur | 382/170 |
| 7,570,816 B2 * | 8/2009 | Bargeron et al. | 382/224 |
| 7,640,219 B2 | 12/2009 | Perrizo | |
| 8,239,335 B2 * | 8/2012 | Schmidtler et al. | 706/20 |

OTHER PUBLICATIONS

Sanderson, C., et al., "Training Method of a Piecewise Linear Classifier for a Multi-Modal Person Verification System", School of Microelectronic Engineering, Australia, 2000, (Published before this application Mar. 2011).

* cited by examiner

*Primary Examiner* — Chan S Park
*Assistant Examiner* — Eueng-Nan Yeh

(57) ABSTRACT

A processor and method make use of multiple weak classifiers to construct a single strong classifier to identify regions that contain text within an input image document. The weak classifiers are grouped by their computing cost from low to median to high, and each weak classifier is assigned a weight value based on its ability to accurately identify text regions. A level 1 classifier is constructed by selecting weak classifiers from the low group, a level 2 classifier is constructed by selecting weak classifiers from the low and median groups, and a level 3 classifier is constructed by selecting weak classifiers from the low, median and high groups. Regions that the level 1 classifier identifies as containing text are submitted to the level 2 classifier, and regions that the level 2 classifier identifies as containing text are submitted to the level 3 classifier.

20 Claims, 19 Drawing Sheets

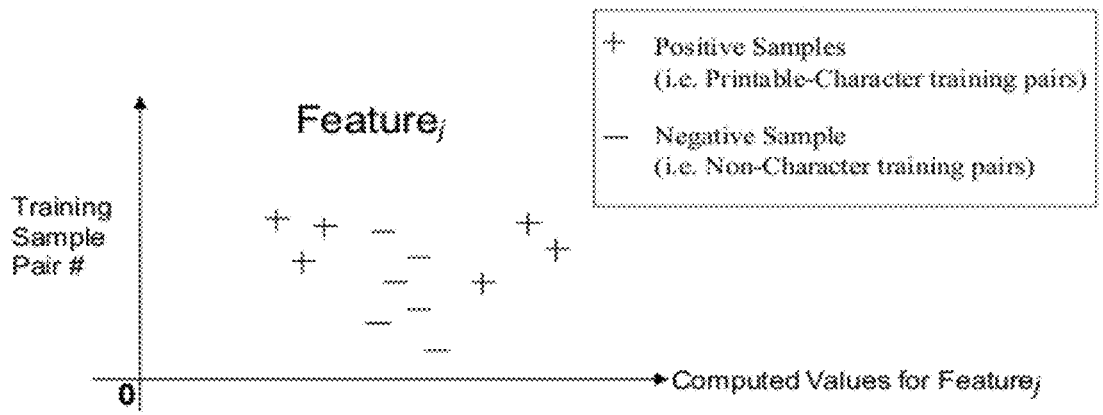

Creating a Level Classifier from F weak classifiers corresponding to F image features within a current level, and a total of P training sample pairs S43 — Compute an initial weight $w_p$ for each of the P training sample pairs (1) $\quad w_p = \dfrac{\text{area of training sample pair } p}{\text{sum of the areas of all P training sample pairs}}$ (2) Initialize iteration counter $t = 0$.

From Step S53 in FIG. 16B ⟶

S45 — Compute classification error $\varepsilon_{t,f}$ within current iteration $t$ for each weak classifier $h_f$ for the all P training sample pairs, where $w_{t,p}$ denotes the weight of training sample pair $p$ within current iteration $t$.

$$\varepsilon_{t,f} = \sum_{p=1}^{P} w_{t,p} \left| h_f(x_p) - y_p \right|$$

where $h_f(x_p)$ is the computed text label (or value) of the weak classifier constructed for feature $f$, $y_p$ is the true text label of training sample $p$, each text label has a value of 1 or -1, and $f = 1$ to F.

S47 — Let $\hat{h}_{t,f}$ denote the best weak classifier among all F weak classifiers $h_1$ to $h_F$ within current iteration $t$. $\hat{h}_{t,f}$ is defined as the weak classifier $h_f(x_p)$ that rendered the smallest classification error $\varepsilon_{t,f}$ in step S45.

$\hat{h}_{t,f} = \text{the } [h_f(x_p)] \text{ that rendered the minimum } (\varepsilon_{t,f})$ S49 — Update the weights $w_{t,p}$ for each of the P training sample pairs $w_{t,p} = w_{t,p} \times \beta_t^{(1-e_p)}$ $e_p = \begin{cases} 0, & \hat{h}_{t,f}(x_p) = y_p \\ 1, & \text{otherwise} \end{cases}$ $\beta_t = \dfrac{\varepsilon_t}{1 - \varepsilon_t}$, and $\varepsilon_t$ is the average of all $\varepsilon_{t,f}$ ∴ $\varepsilon_t = \dfrac{\sum_{f=1}^{F} \varepsilon_{t,f}}{F}$

IDENTIFYING TEXT PIXELS IN SCANNED IMAGES

BACKGROUND

1. Field of Invention

The present invention relates to the identifying of text regions within an image file of a document.

2. Description of Related Art

Optical character recognition, or OCR, is a broad term applied to the general field of using machines to recognize human-readable glyphs, such as alphanumeric text characters and Chinese written characters, or more generally, Asian written characters. There are many approaches to optical character recognition, such as discussed in U.S. Pat. No. 5,212,741. However, an integral part of the field of OCR is a step to first identify, i.e. classify, regions of an image as text or non-text. Image regions identified as text may then be further processed to identify specific text characters or Asian written characters.

Various approaches to distinguishing text regions from non-text regions of an image have also been proposed. For example, U.S. Pat. No. 6,038,527 suggests searching a document image for word-shape patterns to identify text regions.

It would be helpful if a machine could determine for itself how to identify text characters and/or Asian written characters. This leads to the field of machine learning, since an ideal would be for a machine to learn how to identify human-readable glyphs, itself.

Data classifiers are associated with the field of machine learning, and are typically applied in areas that require sorting through large data samples, such as the data mining technique described in U.S. Pat. No. 7,640,219. Data classifiers have also been applied to the field of OCR, as demonstrated by U.S. Pat. No. 5,640,492, which describes the use of a soft-margin classifier in text recognition.

Generally, in data classification various positive samples and negative samples are provided to a machine in a training phase to establish positive and negative references, and thereby to establish two classes. Once training is complete, the machine is asked to assign a newly provided sample to one of the two classes based on what it has learned.

For example, if each data point in an existing sample of data points can be designated as belonging to one of two classes, a goal could be for a machine to determine for itself to which class a newly provided data point should belong.

In the case of support vector machines, each data point may be viewed as a p-dimensional vector (i.e., a list of p numbers), and the goal is to determine whether such points can be separated with a (p−1)-dimensional hyperplane. This may be termed linear classification.

A hyperplane is a concept in geometry, and it is a generalization of the concept of a plane into higher dimensions. Analogous with a plane which defines a two-dimensional subspace in a three-dimensional space, a hyperplane defines an m-dimensional subspace within a q-dimensional space, where m<q. A line, for example, is a one-dimensional hyperplane in a higher dimension space.

The main idea in using a hyperplane in data analysis is to construct a divide (i.e. a hyperplane) that separates clusters of data points, or vectors, (i.e. separates data points into different classes). These separated data point clusters can then be used for data classification purposes. There may be many different hyperplanes that divide the data points into separate clusters, but some hyperplanes will provide better divisions of data points than others. Intuitively, a good choice of hyperplane is one that provides a good separation. That is, the best of choice of hyperplane would be the hyperplane that has the largest distance (i.e. functional margin) to the nearest training data points of the different classes. This is because, typically, the larger the functional margin, the lower the generalization error of the classifier. Thus, although there might be many hyperplanes that classify the data (i.e. may separate the data into classifications, or data clusters), one hyperplane may offer optimal separation.

For example, FIG. 1 shows a 2-dimensional space with eighteen data points (or vectors) separated into two clusters of nine data points, each. A first data cluster of nine data points is shown as black data points, and a second data cluster of nine data points is shown as white data points. For illustrative purposes, three candidate hyperplanes 11, 13, and 15 (i.e. three lines in the present 2-dimensional example) are shown to successfully separate the eighteen data points into two groups, or classes, of data points, but one of the three candidate hyperplanes offers the best data-point separation.

In the present example, hyperplane 13 separates four black data points on its left (side A) from five black data points and nine white data points on its right (side B). In order to obtain meaningful information, however, it is helpful to divide the data points into data clusters since the data points in each data cluster are likely to have some similar attributes. In the present case, it is relatively self-apparent that hyperplane 13 does not provide meaningful information regarding similarities or differences between the black and white data points since hyperplane 13 does not accurately differentiate between the two data clusters.

Hyperplane 11 does separate the first data cluster (consisting of nine black data points) on its upper side (side C) from the second data cluster (consisting of nine white data points) on its lower side (side D), but does not provide the optimal separation between the first and second data clusters.

In order to provide meaningful information, it is preferable that the hyperplane that separates the two data clusters provide a maximum separation between the two data clusters. The objective is to choose the hyperplane in which the functional margin (i.e. the distance from the hyperplane to the nearest data point along a line normal to the hyperplane) on each side is maximized. If such a hyperplane exists, it is known as the maximum-margin hyperplane, and such a linear classifier is known as a maximum margin classifier.

In the present example of FIG. 1, margin line 16 defines the border of the first data cluster of black data points with reference to hyperplane 15, and margin line 18 defines the border of the second data cluster of white data points with reference to hyperplane 15. The data points (or vectors) along margin lines 16 or 18 are typically called support vectors. The bias from the origin to hyperplane 15 is shown as bias term b. The functional margin w of hyperplane 15 to margin lines 16 and 18 is likewise shown. In the present case, hyperplane 15 would be the maximum margin classifier since it has the largest functional margin among the three candidate hyperplanes 11, 13, 15.

As shown, classifiers are effective at sorting data into two classes, such as text regions and non-text regions in an image sample, but they are generally very computationally expensive, requiring much computing resources. Furthermore, text regions may have a multiplicity of patterns in various orientations, and may be made distinguishable from non-text regions by a multitude of geometric, luminescent, and chromatic properties, such that separation into two classes may not be computationally practical. This is particularly the case when consideration both Western alphanumeric characters and Asian written characters, which may be written in different fonts and colors.

What is needed is a method of making use of the classifying strength of classifiers, while simplifying its application and reducing its computational requirements.

SUMMARY OF INVENTION

It is an object of the present invention to provide a practical method of applying machine learning techniques to the field of OCR.

Another object of the present invention is to improve the identifying of true text regions and reduce the misidentifying of non-text regions are text regions.

A further object of the present invention is to reduce the instances of misidentifying text regions as non-text regions.

The above objects are met in a method of identifying regions of an input image that contain human-readable, printable characters, the method having the following steps; (1) providing a plurality of training images, the training images having printable character regions containing examples of the printable characters and non-character regions not containing examples of the printable characters; (2) for each of the training image, applying the following steps: (a) identifying printable-character regions and non-printable regions, each identified printable-character region and identified non-printing region being designated a training region; (b) constructing a connected components (CC) region for each training region by constructing connected components of the foreground pixels in each training region, each CC region and its corresponding training region from which it is constructed constituting a training sample pair; (c) computing a plurality of image feature characteristic statistics for each training sample pair, wherein each image feature characteristic statistic provides distinguishing information of each sample pair; (3) defining a character classifier block using the image feature characteristic statistics, the character classifier block including at least a level 1 classifier sub-block, a level 2 classifier sub-block and level 3 classifier sub-block, each classifier sub-block classifying a received image region as a printable-character region or as a non-printable regions, wherein the level 2 classifier sub-block has a greater computational cost than the level 1 classifier sub-block, and the level 3 classifier sub-block has a greater computational cost than the level 2 classifier sub-block; (4) extracting a plurality of test sample pairs from the input image, each test sample pair including a test image region of the input image and a test CC region constructed from the test image region; (5) submitting the plurality of test sample pairs to the character classifier block, wherein: the level 1 classifier sub-block receives for classification all of the plurality of test sample pairs; the level 2 classifier sub-block receives for classification test sample pairs classified as printable-character regions by the level 1 classifier sub-block and does not receive any test sample pairs classified as non-character regions by the level 1 classifier sub-block; and the level 3 classifier sub-block receives for classification test sample pairs classified as printable-character regions by the level 2 classifier sub-block and does not receive any test sample pairs classified as non-character regions by the level 2 or level 1 classifier sub-blocks; and (6) designating the test image regions of the test sample pairs classified as printable-character regions by the level 3 classifier sub-block as the regions of the input image that contain human-readable, printable characters.

In this method, the human-readable, printable characters include at least one of text characters and Asian printable characters. Additionally, in step (a), the printable-character regions and non-printable regions are preferably identified manually.

Preferably step (2) further includes the following step (d) after step (c): (d) grouping the image feature characteristic statistics into a plurality of categories according to their respective computational cost, wherein the image feature characteristic statistics in teach category have a similar computational cost, arranging the categories into a sequence of increasing computational cost.

In this approach, within step (d), the plurality of categories are three categories defined as a geometric feature category computed from the CC training region of each training sample pair, a color feature category, and a character edge feature category; and the geometric feature category is first, the color feature category is second, and the character edge category is third in the sequence of increasing computational cost.

Preferably in step (3), the construction of the character classifier block including the following steps: (i) constructing a separate weak classifier for each image feature characteristic statistic, wherein each weak classifier classifies an image region as a printable-character region or as a non-printable regions based on the computed results of its corresponding image feature characteristic statistic; (ii) constructing the level 1 classifier sub-block by combining a first plurality of weak classifiers corresponding to image feature characteristic statistics in categories not higher than in a first category in the sequence of increasing computational cost; (iii) constructing the level 2 classifier sub-block by combining a second plurality of weak classifier corresponding to image features characteristic statistics in categories not higher than a second category in the sequence of increasing computational cost, the second category being higher than the first category in the sequence of increasing computational cost; (iv) constructing the level 3 classifier sub-block by combining a third plurality of weak classifier corresponding to image features characteristic statistics in categories not higher than a third category in the sequence of increasing computational cost, the third category being higher than the second category in the sequence of increasing computational cost.

Further in this approach, the level 1 classifier sub-block combines weak classifiers corresponding to image feature characteristic statistics selectable from the first category and any other category below the first category in the sequence of increasing computational cost; the level 2 classifier sub-block combines weak classifiers corresponding to image feature characteristic statistics selectable from the second category and any other category below the second category in the sequence of increasing computational cost; and the level 3 classifier sub-block combines weak classifiers corresponding to image feature characteristic statistics selectable from the third category and any other category below the third category in the sequence of increasing computational cost.

Also in this approach, there are F image feature characteristic statistics, each image feature statistic is termed f, in turn, below where f=1 to F, and in step (i), the constructing of each separate weak classifier, $h_f$, includes the following steps applied to each image feature characteristic statistic f: identifying the maximum (max) and minimum (min) value of image feature characteristic statistic f from step (c); dividing the range of values, [min, max], into a fixed number of value intervals n; adding a lower-boundary interval [−infinity to min] at the lower end of the value intervals and adding an upper-boundary internal [max to +infinity] at the upper end of the value intervals to create a total of n+2 value intervals; defining a positive histogram comprised of the computed results from step (c) for image feature characteristic statistic f corresponding to training sample pairs defined from printable-character regions; defining a negative histogram comprised of the computed results from step (c) for image feature characteristic statistic f corresponding to training sample pairs defined from non-printable regions; wherein the positive histogram and the negative histogram have a one-to-one correspondence between histogram value intervals, and each histogram has n+2 value intervals, the value intervals within the positive histogram of image feature characteristic statistic f being identifiable as $POS_f(j)$ where j=1 to (n+2), and the value intervals within the negative histogram of image feature characteristic statistic f being identifiable as $NEG_f(j)$ where j=1 to (n+2); the defining of the positive histogram include, for each image feature characteristic statistic f corresponding to training sample pairs defined from printable-character regions, if the feature value lies in the jth interval, then $POS_f(j)=POS_f(j)+1$; and the defining of the negative histogram include, for each image feature characteristic statistic f corresponding to training sample pairs defined from non-printable regions, if the feature value lies in the jth interval, then $NEG_f(j)=NEG_f(j)+1$. In this case, n may be set to 30.

Additionally in operation, when receiving a test sample region for classification, the value of each image feature statistic f of the test sample region computed in turn is termed x, and the processing of $h_f(x)$ includes: for each weak classifier $h_f(x)$, where f=1 to F, determine within which of the (n+2)/j histogram intervals x falls, and for the determined j histogram interval, IF $POS_f(j) \geq NEG_f(j)$, THEN the x is deemed a printable-character region according to image feature statistic f; ELSE the x is deemed a non-printable region according to image feature statistic f; and after determining $h_f(x)$ for all F image feature statistics, if x is deemed a printable-character region more often than a non-printable region, then the test sample region is classified as a printable-character region, otherwise the test sample region is classified as non-printable region.

Additionally in this embodiment, step (i) further includes assigning a weight to each weak classifier according to its ability to accurately differentiate between printable-character regions and non-printable character regions; and in step (ii), the first plurality of weak classifiers are selected from among the most accurate weighted weak classifiers corresponding to image feature characteristic statistics in categories not higher than the first category.

Alternatively in this embodiment, in each of steps (ii), (iii) and (iv), IF in the construction of each of the level 1, level 2 and level 3 classifier sub-blocks: the number of weak classifiers used in its construction is designated F, each weak classifier hf in its construction corresponds to a respective image feature characteristic statistic f where f=1 to F, and the total number of training sample pairs is designated P, THEN the constructing of each of the level 1, level 2 and level 3 classifier sub-blocks includes the following steps: (I) Computing an initial weight $w_p$ for each of the P training sample pairs as follows, $$w_p = \frac{\text{area of training sample pair } p}{\text{sum of the areas of all } P \text{ training sample pairs}}$$

(II) initializing an iteration counter t=0; (III) computing classification error $\epsilon_{t,f}$ within current iteration t for each weak classifier $h_f$ for the all P training sample pairs, where $w_{t,p}$ denotes the weight of training sample pair p within current iteration t.

$$\epsilon_{t,f} = \sum_{p=1}^{P} w_{t,p} |(h_f(x_p) - y_p)|$$

where a classification of printable-character region is assigned a value of 1 and a classification of non-printable region is assigned a value of $-1$, $h_f(x_p)$ is the computed classification of the weak classifier constructed for feature f, $y_p$ is the true classification of training sample p; (IV) letting $\hat{h}_{t,f}$ denote the best weak classifier among all F weak classifiers $h_1$ to $h_F$ within current iteration t, $\hat{h}_{t,f}$ is defined as the weak classifier $h_f(x_p)$ that rendered the smallest classification error $\epsilon_{t,f}$ in step (III) as follows $$\hat{h}_{t,f} = \text{the}[h_f(x_p)] \text{that rendered the minimum}(\epsilon_{t,f});$$

(V) updating the weights $w_{t,p}$ for each of the P training sample pairs as follows $$w_{t,p} = w_{t,p} \times \beta_t (1 - e_p)$$

$$e_p = \begin{cases} 0, & \hat{h}_{t,f}(x_p) = y_p \\ 1, & \text{otherwise} \end{cases}$$

where $$\beta_t = \frac{\epsilon_t}{1 - \epsilon_t},$$

and $\epsilon_t$ is the average of all $\epsilon_{t,f}$:

$$\epsilon_t = \frac{\sum_{f=1}^{F} \epsilon_{t,f}}{F};$$

(VI) skipping to step (IX) if t=F; (VII) incrementing t by 1; (VIII) normalizing updated sample weights as follows $$w_{t,p} = \frac{w_{[(t-1),p]}}{\sum_{p=1}^{P} w_{[(t-1),p]}}$$

and returning to step (III); (IX) defining the current classifier $\hat{h}(x)$ by combing select weak classifiers from among the best weak classifiers $\hat{h}_{t,f}$ of the past F iterations as follows:

$$\hat{h}(x) = \begin{cases} +1, & \sum_{t=1}^{F} \alpha_t \hat{h}_t(x) \geq \left(\frac{1}{2}\right) \sum_{t=1}^{F} \alpha_t, \quad \alpha_t = \log\left(\frac{1}{\beta_t}\right) \\ -1, & \text{otherwise.} \end{cases}$$

Additionally in this method, in step (5), all test sample pairs not classified as printable-character regions by the level 1 classifier sub-block are discarded from further processing, and all test sample pairs not classified as printable-character regions by the level 2 classifier sub-block are discarded from further processing.

Further, preferably in step (5), the level 2 classifier sub-block receives only test sample pairs that the level 1 classifier sub-block classifies as printable-character regions, and the level 3 classifier sub-block receives only the test sample pairs that the level 2 classifier sub-block classifies as printable-character regions.

The above objects are also achieved in a data processing device implementing the method of claim 1.

The above objects are further achieved in a computing device for identifying regions of an input image that contain human-readable, the computing device having; an input for receiving the input image; a data processor to implement the following step: (1) implementing a training phase including: (a) receiving a plurality of training regions, each training region being an example of a printable-character region or a non-printable region; (b) for each received training region, constructing a connected components (CC) region for each training region by constructing connected components of the foreground pixels in each training region, each CC region and its corresponding training region from which it is constructed constituting a training sample pair; (c) for each training sample pair, computing a plurality of image feature characteristic statistics for each training sample pair, wherein each image feature characteristic statistic provides distinguishing information of each sample pair; (2) defining a character classifier processing block using the image feature characteristic statistics, the character classifier processing block including at least a level 1 classifier sub-block, a level 2 classifier sub-block and level 3 classifier sub-block, each classifier sub-block classifying a received image region as a printable-character region or as a non-printable regions, wherein the level 2 classifier sub-block has a greater computational cost than the level 1 classifier sub-block, and the level 3 classifier sub-block has a greater computational cost than the level 2 classifier sub-block; (3) extracting a plurality of test sample pairs from the input image, each test sample pair including a test image region of the input image and a test CC region constructed from the test image region; (4) submitting the plurality of test sample pairs to the character classifier block, wherein: the level 1 classifier sub-block receives for classification all of the plurality of test sample pairs; the level 2 classifier sub-block receives for classification test sample pairs classified as printable-character regions by the level 1 classifier sub-block and does not receive any test sample pairs classified as non-character regions by the level 1 classifier sub-block; and the level 3 classifier sub-block receives for classification test sample pairs classified as printable-character regions by the level 2 classifier sub-block and does not receive any test sample pairs classified as non-character regions by the level 2 or level 1 classifier sub-blocks; and (7) designating the test image regions of the test sample pairs classified as printable-character regions by the level 3 classifier sub-block as the regions of the input image that contain human-readable, printable characters.

In this computing device, step (1) further includes the following step after step (c): (d) grouping the image feature characteristic statistics into a plurality of categories according to their respective computational cost, wherein the image feature characteristic statistics in teach category have a similar computational cost, arranging the categories into a sequence of increasing computational cost.

Preferably in step (2), the construction of the character classifier processing block including the following steps: (i) constructing a separate weak classifier for each image feature characteristic statistic, wherein each weak classifier classifies an image region as a printable-character region or as a non-printable regions based on the computed results of its corresponding image feature characteristic statistic; (ii) constructing the level 1 classifier sub-block by combining a first plurality of weak classifiers corresponding to image feature characteristic statistics in categories not higher than in a first category in the sequence of increasing computational cost; (iii) constructing the level 2 classifier sub-block by combining a second plurality of weak classifier corresponding to image features characteristic statistics in categories not higher than a second category in the sequence of increasing computational cost, the second category being higher than the first category in the sequence of increasing computational cost; (iv) constructing the level 3 classifier sub-block by combining a third plurality of weak classifier corresponding to image features characteristic statistics in categories not higher than a third category in the sequence of increasing computational cost, the third category being higher than the second category in the sequence of increasing computational cost.

Preferably, the level 1 classifier sub-block combines weak classifiers corresponding to image feature characteristic statistics selectable from the first category and any other category below the first category in the sequence of increasing computational cost; the level 2 classifier sub-block combines weak classifiers corresponding to image feature characteristic statistics selectable from the second category and any other category below the second category in the sequence of increasing computational cost; and the level 3 classifier sub-block combines weak classifiers corresponding to image feature characteristic statistics selectable from the third category and any other category below the third category in the sequence of increasing computational cost. 20. The method of claim 18, wherein there are F image feature characteristic statistics, each image feature statistic is termed f, in turn, below where f=1 to F, and in step (i), the constructing of each separate weak classifier, $h_f$, includes the following steps applied to each image feature characteristic statistic f: identifying the maximum (max) and minimum (min) value of image feature characteristic statistic f from step (c); dividing the range of values, [min, max], into a fixed number of value intervals n; adding a lower-boundary interval [−infinity to min] at the lower end of the value intervals and adding an upper-boundary internal [max to +infinity] at the upper end of the value intervals to create a total of n+2 value intervals; defining a positive histogram comprised of the computed results from step (c) for image feature characteristic statistic f corresponding to training sample pairs defined from printable-character regions; defining a negative histogram comprised of the computed results from step (c) for image feature characteristic statistic f corresponding to training sample pairs defined from non-printable regions; wherein the positive histogram and the negative histogram have a one-to-one correspondence between histogram value intervals, and each histogram has n+2 value intervals, the value intervals within the positive histogram of image feature characteristic statistic f being identifiable as $POS_f(j)$ where j=1 to (n+2), and the value intervals within the negative histogram of image feature characteristic statistic f being identifiable as $NEG_f(j)$ where j=1 to (n+2); the defining of the positive histogram include, for each image feature characteristic statistic f corresponding to training sample pairs defined from printable-character regions, if the feature value lies in the jth interval, then $POS_f(j)=POS_f(j)+1$; and the defining of the negative histogram include, for each image feature characteristic statistic f corresponding to training sample pairs defined from non-printable regions, if the feature value lies in the jth interval, then $NEG_f(j)=NEG_f(j)+1$.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 12A and 12B illustrate prior art methods of having only two intervals for classification.

FIG. 12C illustrates the use a multitude of intervals of varying sizes for classification purposes.

FIGS. 16A and 16B provide a more detailed description of the overview of FIG. 15.

DESCRIPTION OF THE PREFERRED EMBODIMENTS

A first step in optical character recognition, OCR, is to identify regions of an input image that contain human-readable glyphs that may constitute alphanumeric text characters and/or Chinese written characters, or more generally be part of any human writable characters (i.e. Western, Eastern, Middle-Eastern, etc.) that a machine is attempting to identify. For ease of discussion, these writable and readable characters are generically identified as printable-characters in the following discussion, unless specified otherwise. Also, a region of an image that is not a printable-character is generally designated a non-character, below.

In other words, an objective of an OCR machine is to differentiate between pixels of a digital input image that are part of printable-characters, from pixels that are not part of printable-characters (i.e. from non-characters). Pixels that are identified as being part of printable-characters may be assigned a "printable-character" label, and be submitted to a character recognition process to identify the printable-characters they represent. If pixels that are part of printable-characters are erroneously identified as being part of non-characters, then the character recognition process will not "see" the entire printable-character structure and thus may fail to accurately identity the printable-character. Similarly, if a pixel that is part of a non-character is erroneously identified as being part of a printable-character, then the character recognition process will "see" a character structure that may not match its known list of printable-characters, and thus again fail to identify the written printable-character.

Figure 1:
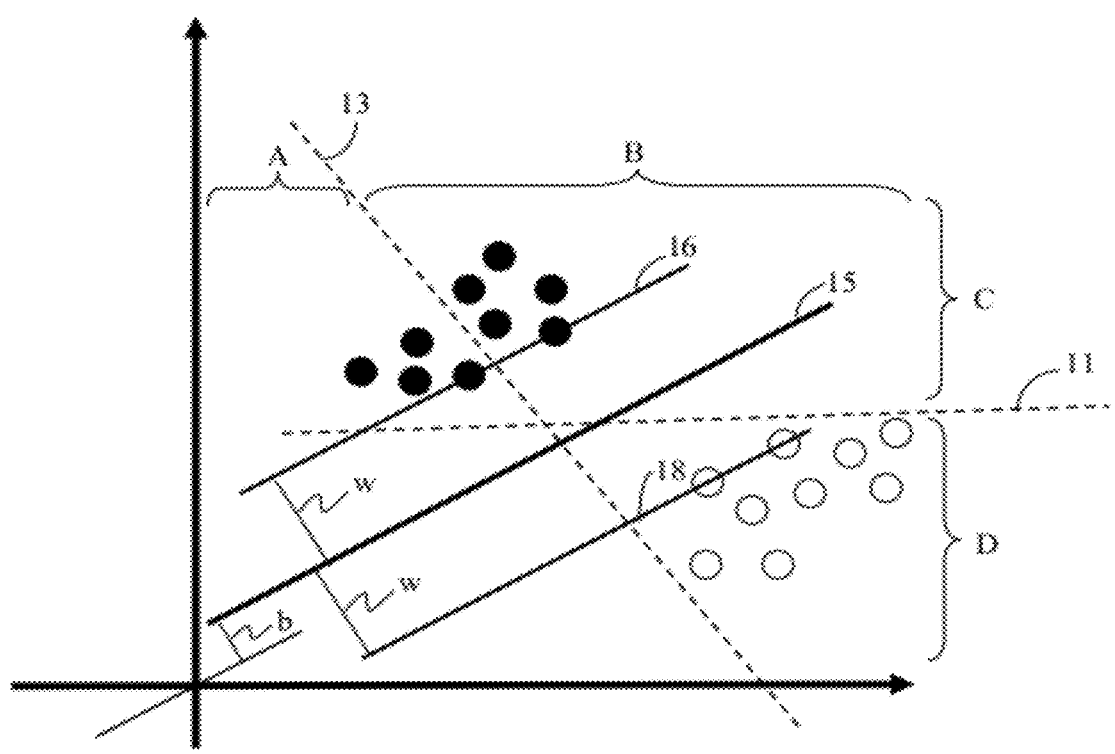
FIG. 1 shows a 2-dimensional space with eighteen data points (or vectors) separated into two clusters of nine data points each.
Figure 2:
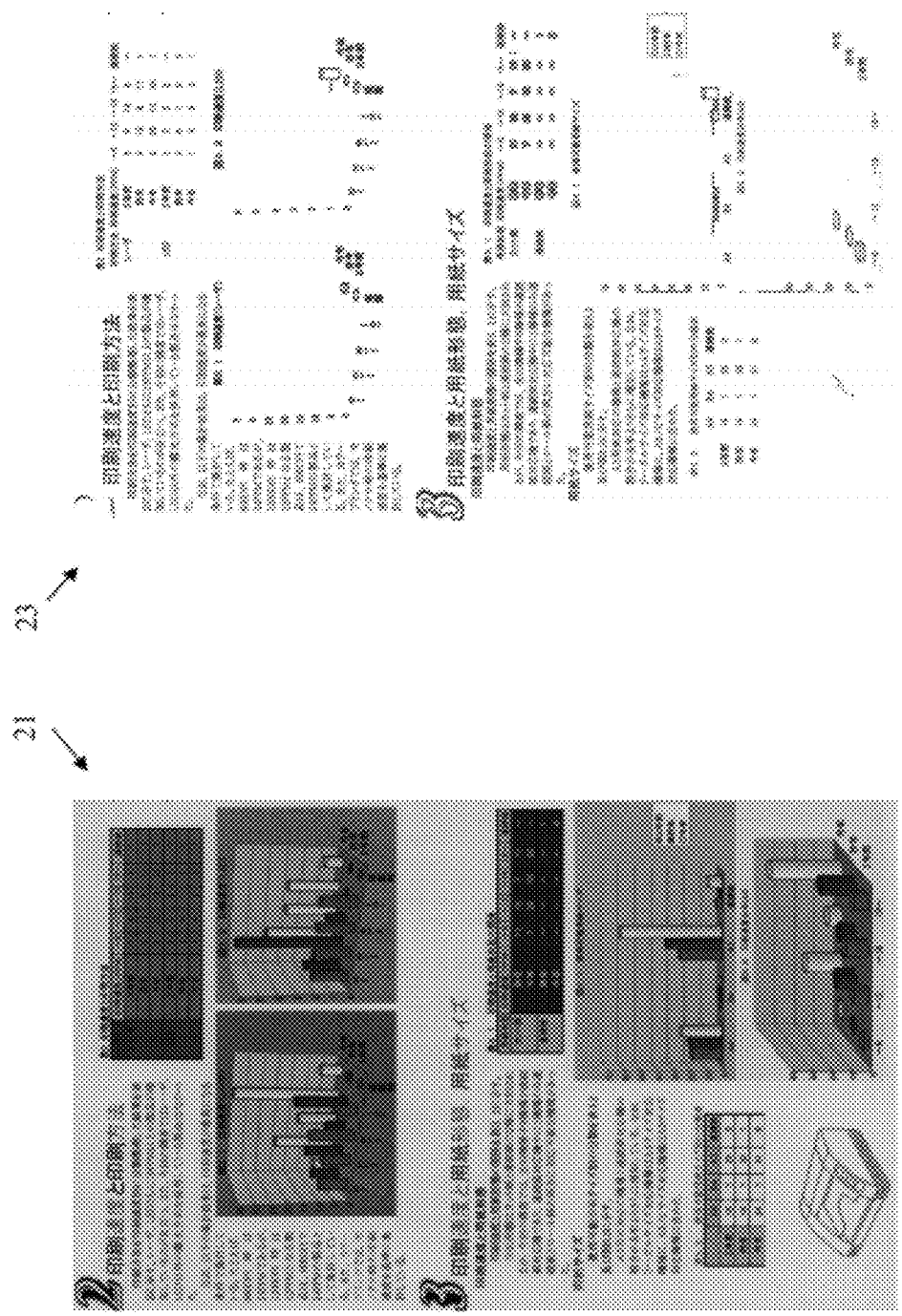
FIG. 2 shows a digital input image created by scanning a printed medium (i.e. a printed sheet of paper) and foreground labeled pixels.

For example, FIG. 2 shows a digital input image 21 created by scanning a printed medium (i.e. a printed sheet of paper). A first step in an OCR machine would be to identify the pixels within input image 21 that are part of printable-characters, resulting in the image 23. Each pixel, shown as a dark dot, in image 23 would be assigned a "printable-character label" (or equivalently, a "text label") identifying it as part of a printable-character. Images 21 and 23 could then be submitted to a character recognition process whose task would be to identify the printable-characters defined by the identified text label pixels in image 23.

The task of differentiating pixels that are part of printable-characters from pixels that are part of non-characters is not trivial. A self-evident solution might be to create a library of printable-characters, and then to search an input image for the printable-characters in the library. However, since there is a large multitude of printable-characters, and this multitude is made larger by the available number of font styles, font sizes, and font colors, it would be impractical with currently available computing resources to use a library of all possible printable-characters in the search for printable-characters within an input file.

It is therefore proposed that a limited number of training image samples, containing both printable-character regions and non-characters regions, be used establish a references for distinguishing printable-character regions from non-characters regions within a given digital input image. It is further proposed that variations on data classification techniques, previously used in the field of machine learning, be used to permit a machine to establish for itself the criteria for differentiating printable-character regions from non-characters regions within a digital input image.

Thus, the presently preferred method for creating a computing device to successfully identify regions that are part of printable-characters within a digital input image consists basically of two stages: a training stage and a testing stage. In the training stage, a series of training images containing examples of printable-characters regions and non-characters regions are used to construct a character classifier that distinguishes printable-character regions from non-printable character regions. In the testing stage, a different set of digital images (i.e. test input images) are submitted to the character classifier for testing, whose accuracy at properly classifying image regions as printable-character regions or non-character regions is then checked. In a presently preferred embodiment, the character classifier checks a plurality of different image features to issue a classification to an image region.

Figure 3:
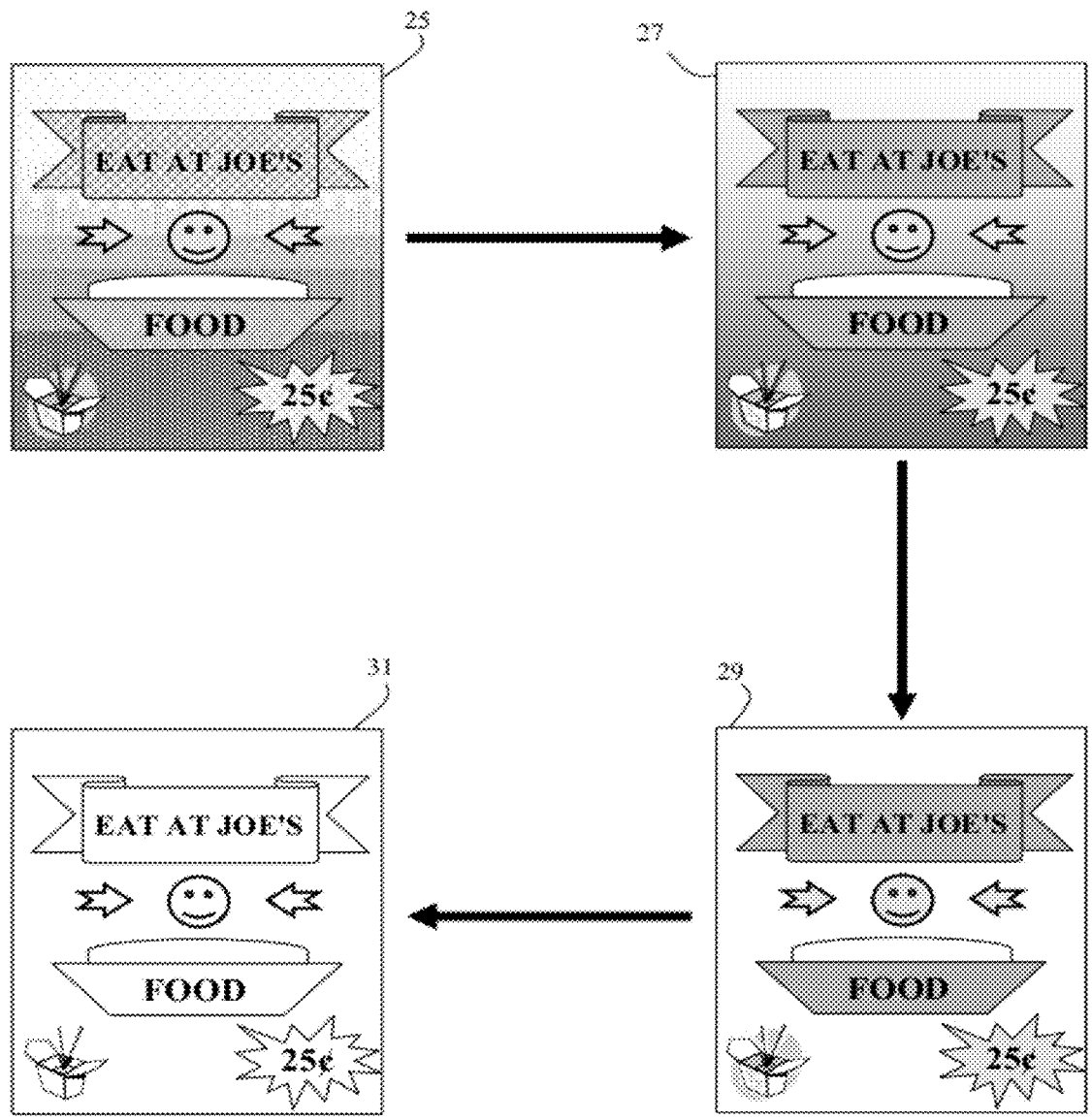
FIG. 3 illustrates the process for identifying foreground pixels.

With reference to FIG. 3, prior to using a training image (such as training image 25) in the creation of the character classifier, each training image 25 is preferably pre-processed. Preferably, training image 25 is smoothed and cleaned resulting in an enhanced image 27. The foreground pixels of enhanced image 27 are identified and labeled (for example, assigned a "foreground" label), as shown in image 29. Various methods of identifying foreground pixels are known, such as that described in U.S. Pat. No. 7,907,778, entitled "Segmentation-based Image Labeling", and assigned to the same assignee as the present application. Finally, connected-components (CC) are constructed from the foreground labeled pixels, as shown in CC image 31. Preferably, a one-to-one relation is maintained between pixels of CC image 31 and corresponding pixels in enhanced image 27. Select regions (or patches) of CC image 31 and corresponding regions of enhanced image 27 are used as training sample pairs for detection of printable-characters.

Figure 4:
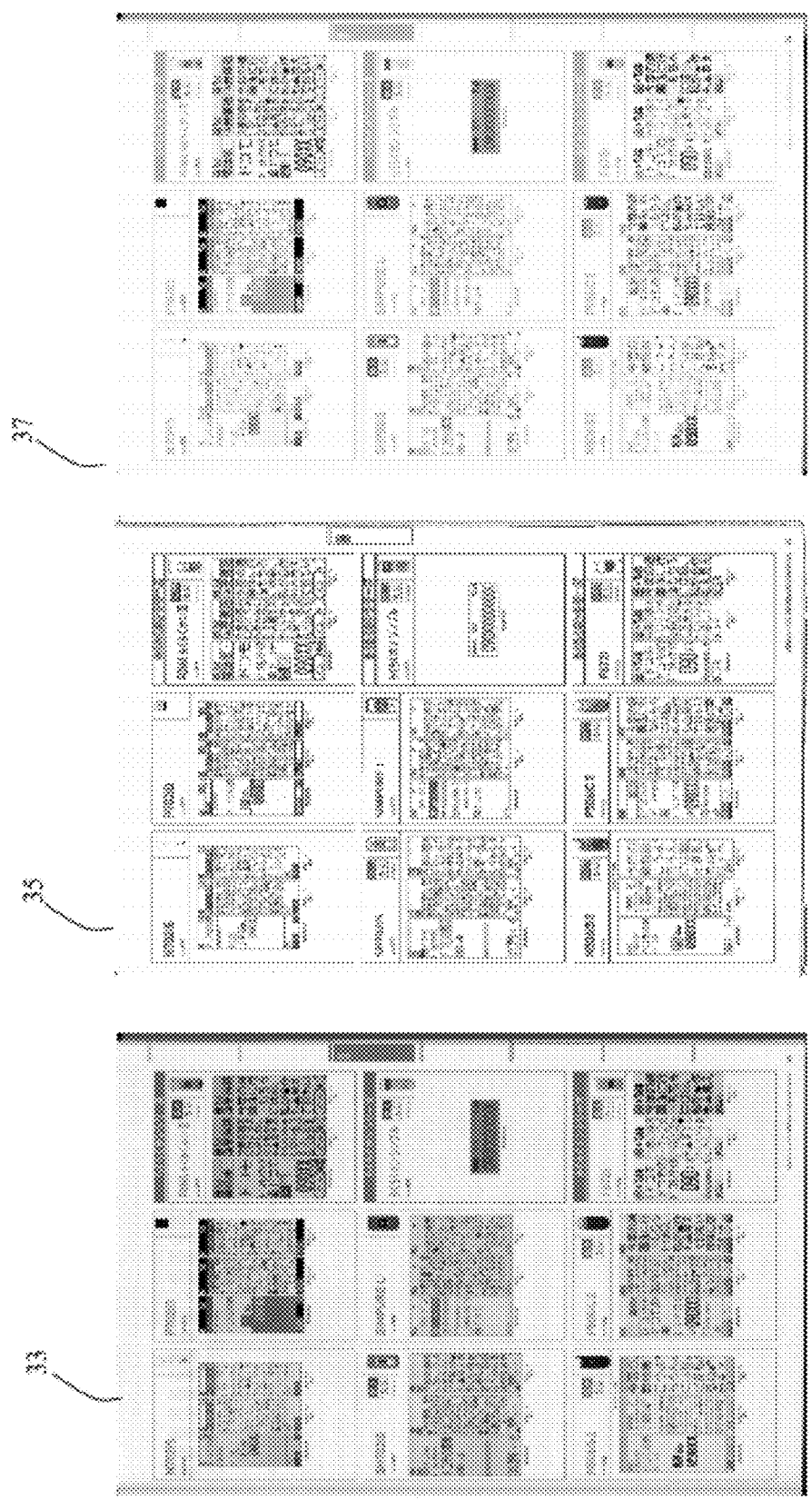
FIG. 4 is another example of identified foreground pixels in an enhanced input image.

A second example of this process in shown in FIG. 4. In the case, scanned image 33 is the input training image. Preprocessing training image 33 results in enhanced image 37 and corresponding connected-component image 35.

Preferably, one does not compare an entire connected-component image of the entire input training image with its corresponding entire enhanced image in order to create the character classifier. Rather, from within each input training image, regions that are examples of printable-characters or examples of non-characters are manually identified to create a plurality of training regions.

Figure 5:
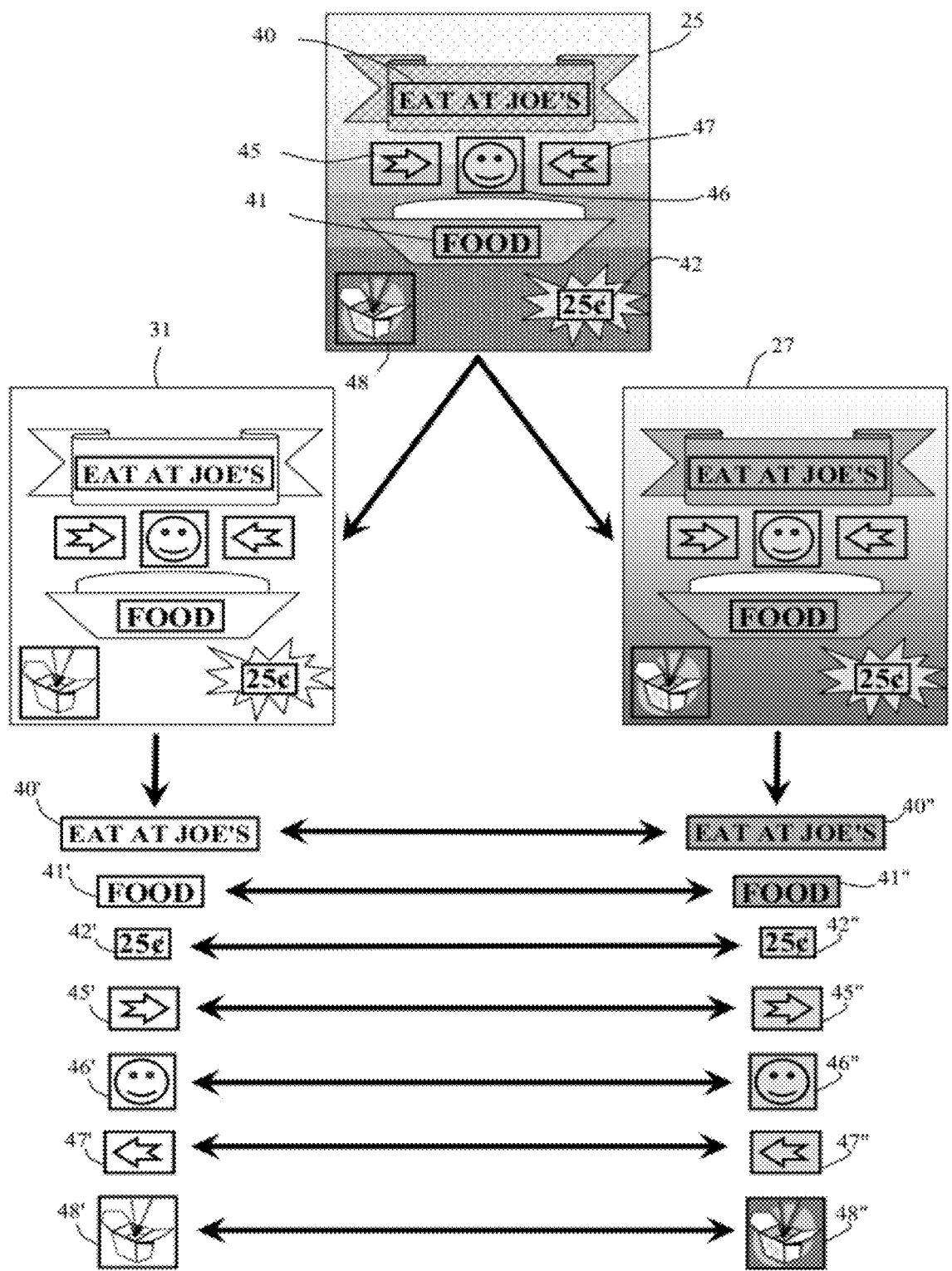
FIG. 5 illustrates a preferred process for creating training sample pairs consisting of image regions and corresponding connected-components regions.

For example in FIG. 5, where all elements similar to those of FIG. 3 have similar reference characters and are described above, regions of training image 25 that contain printable-characters are manually identified, such as by enclosing them in outlines to define printable-character training regions 40-42. Similarly, examples of non-characters may be manually identified by outlines to defined non-character training regions 45-48.

Printable-character training regions 40-42 are identified as CC printable-character training regions 40'-42' within CC image 31, and identified as enhanced printable-character training regions 40"-42" within enhanced image 27. A printable-character training sample pair is defined by each CC printable-character training region 40'-42' and its corresponding enhanced printable-character training region 40"-42".

Similarly, non-character training regions 45-48 are identified as CC non-character training regions 45'-48' within CC image 31, and identified as enhanced non-character training regions 45"-48" within enhanced image 27. A non-character training sample pair is defined by each CC non-character training region 45'-48' and its corresponding enhanced non-character training region 45"-48". Thus, multiple printable-character training samples pairs and non-character training sample pairs may be created from a single input training image.

Herein below, the combination of printable-character training regions and non-character training regions are collectively identified as "training regions". Also herein below, the combination of printable-character training sample pairs and non-character training sample pairs are collectively identified as "training sample pairs".

In the present example, the training regions are defined directly on input training image 35. Alternatively, printable-character and/or non-character training regions may be manually defined directly on either of enhanced image 27 or CC image 31, so long as a one-to-one correspondence is maintained between corresponding training regions of enhanced image 27 and CC image 31.

Figure 6A:
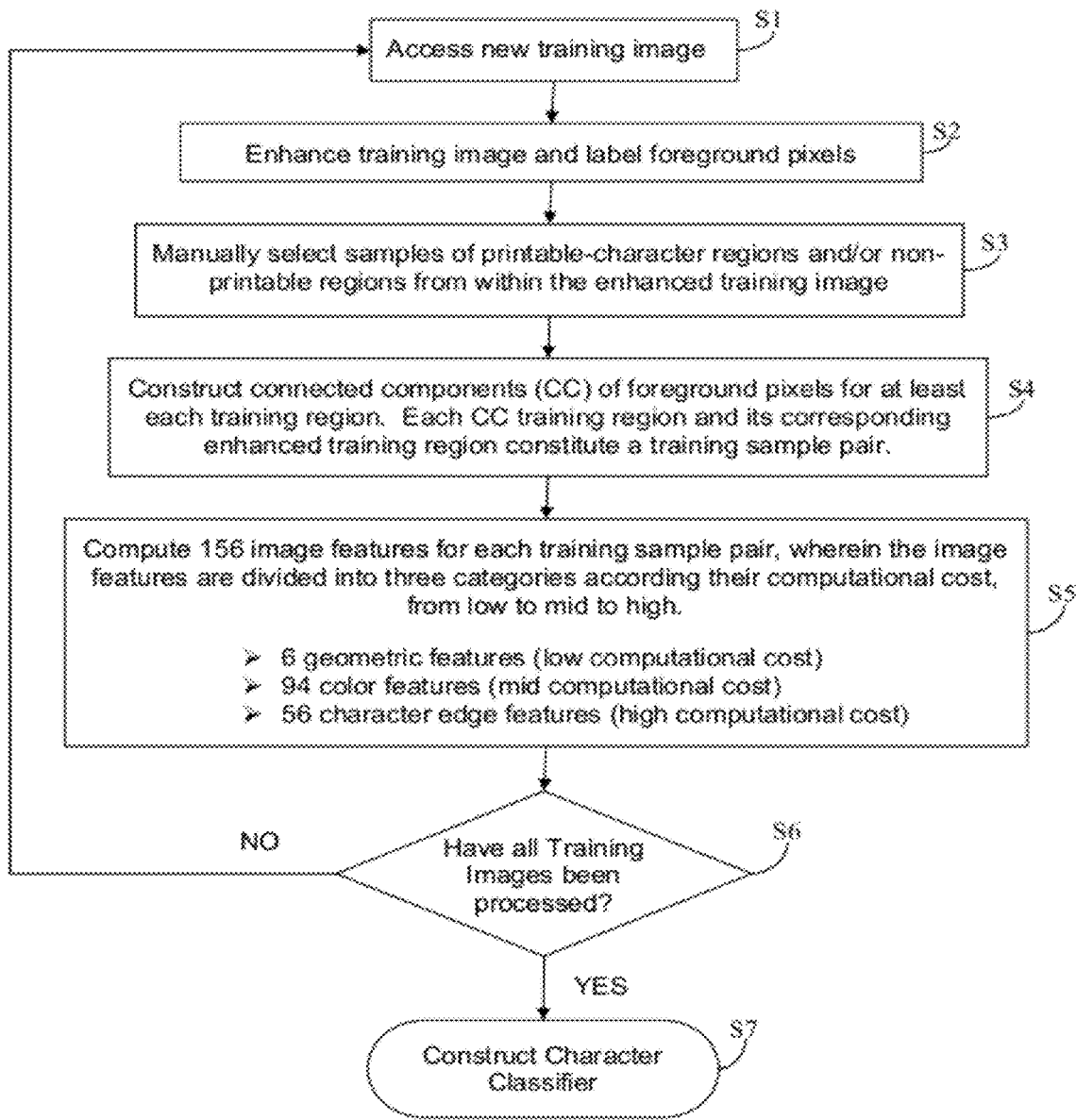
FIG. 6A illustrates a method of defining a plurality of training sample pairs from a group of input training images, and its associated preprocessing.

In summary with reference to FIG. 6A, the presently preferred method of defining a plurality of training sample pairs from a group of input training images begins by accessing a first training image from within the group (step S1), i.e. an image file to be used for training purposes. The accessed training image is enhanced, and its foreground pixels are identified, i.e. labeled, in step S2.

In one embodiment of the present invention, training regions are manually defined in the enhanced image (step S3). Training regions that identify printable-characters may be labeled as enhanced printable-character training regions, and training region identifying non-characters may be labeled as enhanced non-character training images.

It is to be understood that the training regions may be defined prior to labeling foreground pixels in step S2. This would make the process more efficient since only foreground pixels within training regions would need to be labeled, rather than all the pixels of the entire input training image. Alternatively, the training regions may be defined directly on the image constructed from the foreground-labeled pixels.

Connected-components (i.e. CC) of the foreground pixels are then constructed. If the training regions have already been defined, as in the case of step S3, then instead of creating connected-components for the entirety of the input training image, multiple CC training regions may be constructed from the foreground pixels corresponding to the defined enhanced training regions. As is explained above, each CC training region and its corresponding enhanced training region constitutes a training sample pair.

Preferably, the process for creating a character classifier begins by first computing a plurality of image features for each training sample pair. The image features are further preferably grouped by complexity (i.e. computational cost), and a separate weak classifier is constructed for each image feature. Each constructed weak classifier is further assigned a weight (i.e. assigned an emphasis multitier) dependant on its ability to accurately classify test sample pairs (i.e. sample pairs used for testing a classifier's accuracy) as printable-character regions or non-character regions. Some of the best weak classifiers are then combined, with a further adjusted emphasis weight, to define the final character classifier. This process is described in more detail below, but a first step in constructing the weak classifiers is to compute the desired image features, as is shown in step S5.

In one embodiment, as is shown in step S5, a plurality of image features, preferably 156 image features, are computed for each training sample pair. The 156 image features are further preferably divided into 3 categories according to computational cost from a low-cost computational category to a mid-cost computational category to a high-cost computational category. Further preferably, the low-cost computational category includes 6 geometric features, the mid-cost computational category includes 94 color features, and high-cost computational category includes 56 character edge features.

If all training sample pairs have been processed (S6=Yes), then the process may end, or the process may continue to create the character classifier from the computed image features, as is indicated at S7. However, if all the training sample pairs have no yet been processed (S6=NO), then the process returns to step S1, and the next training image sample is accessed for processing.

Figure 6B:
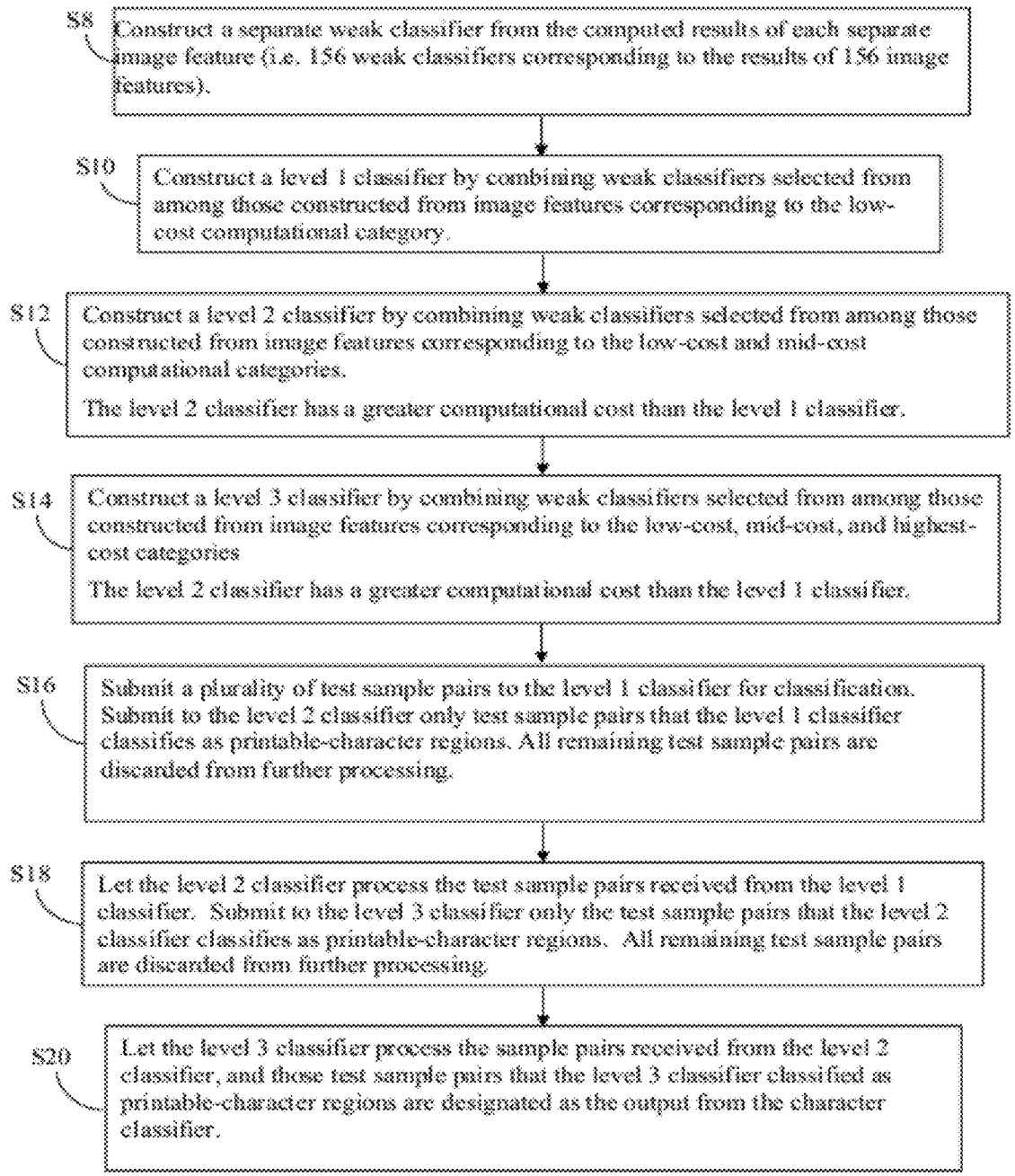
FIG. 6B is an overview of a character classifier in accord with an embodiment of the present invention.

An overview of a character classifier in accord with an embodiment of the present invention is shown in FIG. 6B.

As is explained below in greater detail, a weak classifier is constructed from the results of computing the 156 image features for all the training sample pairs (step S8). That is, a separate weak classifier is constructed from the computed results of each separate image feature (i.e. 156 weak classifiers corresponding to the results of 156 image features).

Select weak classifier are then combined to create a level 1 classifier (step S10), a level 2 classifier (step S12), and a level 3 classifiers (step S14). The level 1, 2, and 3 classifier are constructed to be of increasing complexity (i.e. increasing computational cost), but to also have an increasing level of accuracy at distinguishing printable-characters from non-characters.

More specifically, a level 1 classifier is constructed by combining weak classifiers selected from among those constructed from image features corresponding to the low-cost computational category. A level 2 classifier is created by combining weak classifiers selected from among those constructed from image features corresponding to the low-cost and mid-cost computational categories. A level 3 classifier is constructed by combining weak classifiers selected from among those constructed from image features corresponding to the low-cost, mid-cost, and highest-cost categories.

For ease of explanation, a new sample pair that needs to be checked and classified as a printable-character region or non-character region, may be designated a test sample pair and is submitted to the character classifier for classifying. The preferred character classifier is constructed by coupling the level 1, 2 and 3 classifiers in series. In operation, assuming that a plurality of test sample pairs need to be classified, the level 1 classifier is applied to all test sample pairs (step S16). Those test sample pairs that the level 1 classifier classified as printable-character regions are submitted to the level 2 classifier, and the remaining test sample pairs are discarded from further processing.

The level 2 classifier processes the test sample pairs received from the level 1 classifier, and those test sample pairs that the level 2 classifier classified as printable-character regions are submitted to the level 3 classifier (step S18). The test sample pairs that the level 2 classifier classifies as non-characters are discarded from further processing.

The level 3 classifier processes the test sample pairs received from the level 2 classifier, and those test sample pairs that the level 3 classifier classified as printable-character regions are the output from the character classifier (step S20).

Figure 7:
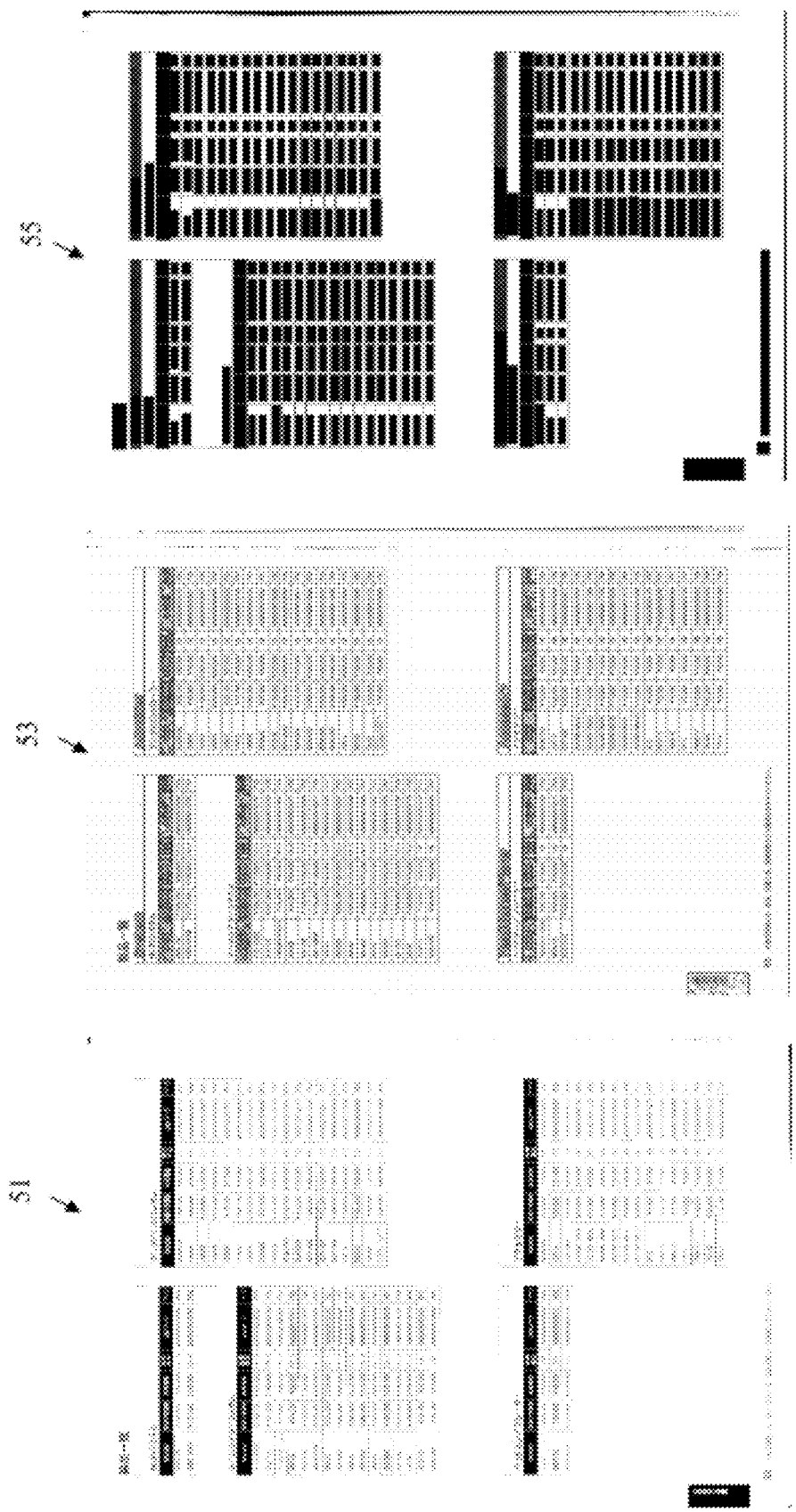
FIG. 7 illustrates the identifying of text regions in an input image.
Figure 8:
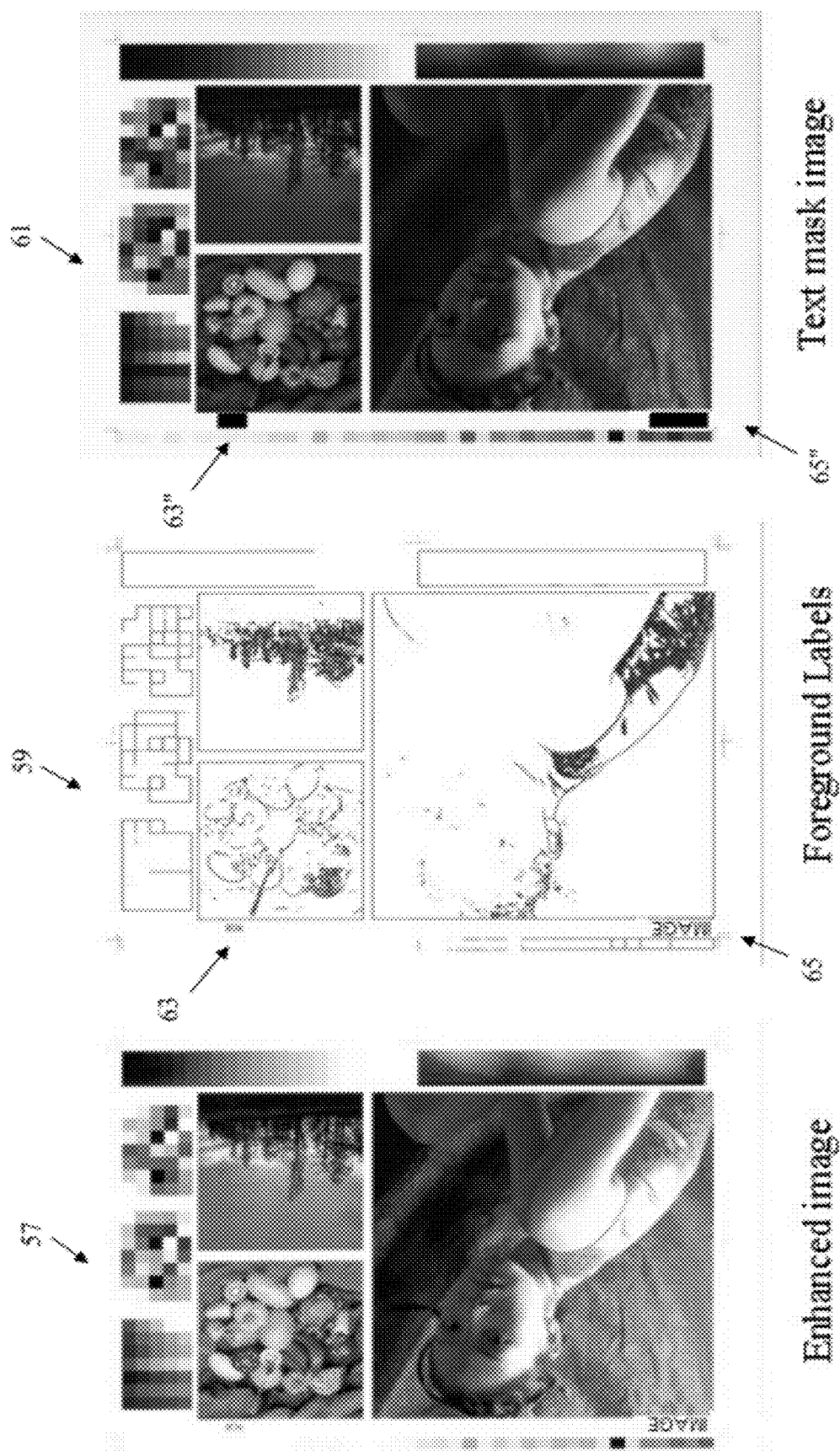
FIG. 8 is another example of the identifying of text regions within an input image.

Examples of two input training image from which multiple training sample pairs may be constructed are respectively shown in FIGS. 7 and 8. In FIG. 7, an enhanced mage 51 is made from an input training image, not shown. The foreground pixels of enhanced image 51 are then identified, i.e. labeled, as depicted in image 53. Regions of printable text are manually identified on enhanced image 51, as depicted in image 55. For ease of explanation, the manually identified printable-character regions are shown as blackened rectangles, but it is to be understood that the printable-character regions may be selected by enclosing them within manually drawn rectangles on enhanced image 51, or by any other method of selecting a region of an image known in the industry.

In FIG. 8, an enhance image 57 is again created from an input training image, not shown, and a foreground image 59 is created from enhanced image 57. In the present case, the only two examples of printable-characters are training regions 63 and 65, and image 61 shows these two examples manually identified as blackened rectangles 63" and 65".

Figure 9:
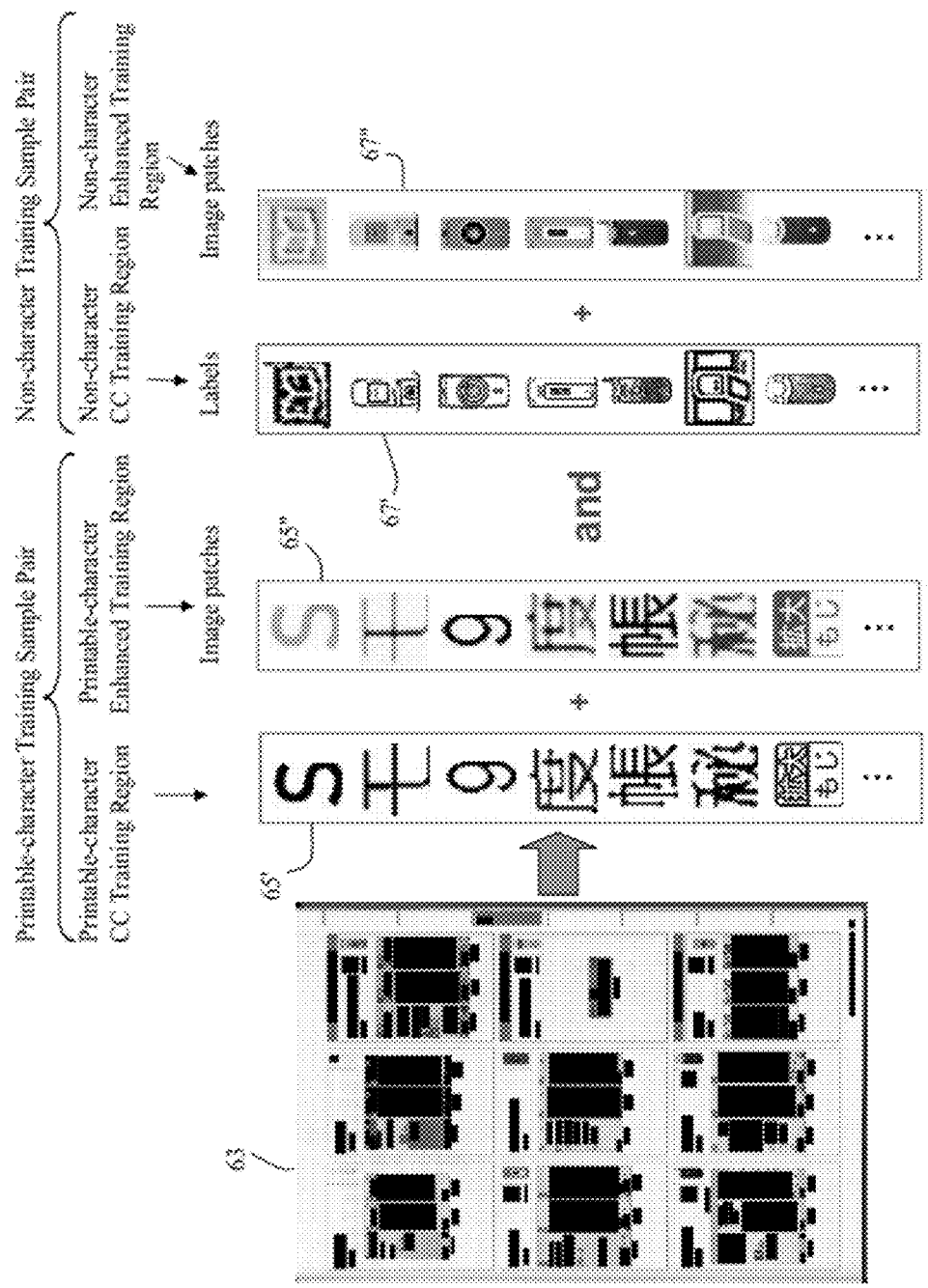
FIG. 9 illustrates the creation of a training sample pair from identified text and non-text regions for training purposes.

Examples of training sample pairs are shown in FIG. 9. In a preferred embodiment, printable-character regions are marked within black rectangles, and the regions outside the black rectangles are assumed to constitute non-character regions. Alternatively, both printable-character training regions and non-character training regions may be separately identified and labeled. Irrespective of how the printable-character training regions and non-character training regions are identified and labeled, training region 65" is an example of an enhanced-character training region, and training region 67" is an example of an enhanced-non-character training region. Enhanced-character training region 65" together with its corresponding CC-character training region 65' constitutes a printable-character training sample pair. Similarly, enhanced-non-character training region 67" together with its corresponding CC-non-character training region 67' constitutes a non-character training sample. Preferably, CC training regions 65' and 67' are constructed by creating connected-components from a foreground labeled image created from in enhanced image 63, or from foreground labeled image regions created from corresponding training regions defined within enhanced image 63.

Figure 10B:
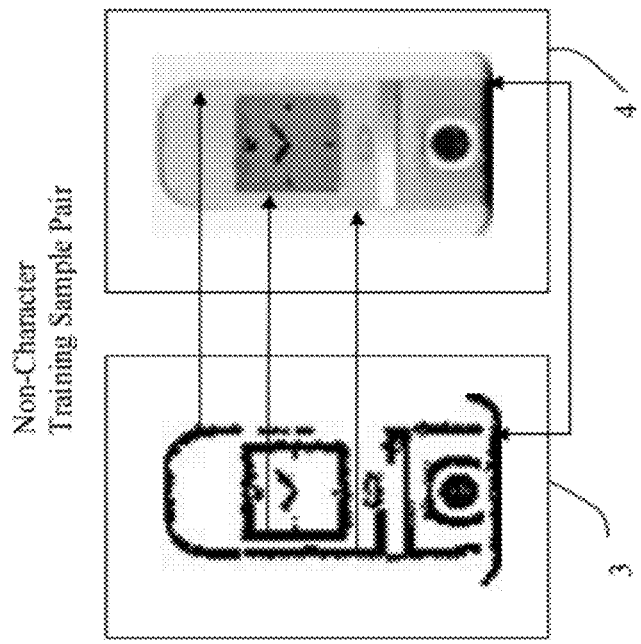
FIGS. 10A and 10B illustrate how image feature characteristic statistics may be defined for training sample pairs.
Figure 10A:
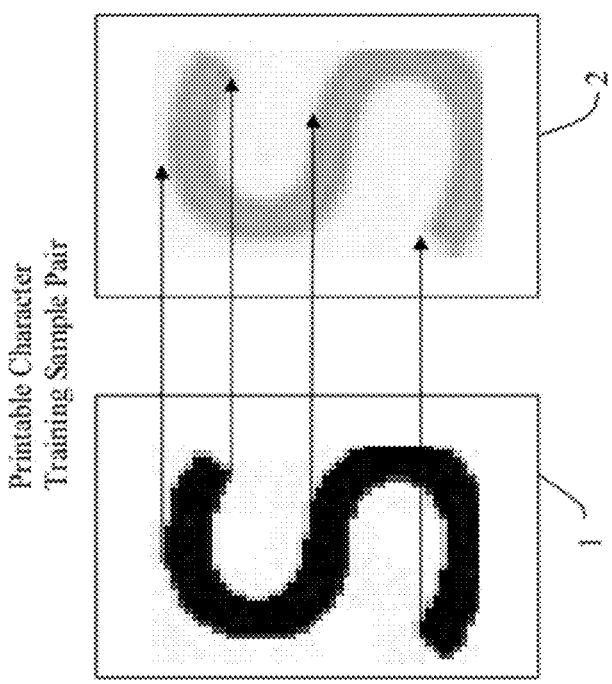

FIG. 10A shows another example of a printable-character training sample pair, and FIG. 10B shows another example of a non-character training sample pair. In both cases, a one-to-one correspondence (illustrated by arrows) is maintained between pixels of the CC training region and the corresponding pixels in the corresponding enhanced training region. For ease of illustration, each training region is outlined by a "bounding box", 1 to 4, which is defined by the perimeter of a training region. The use of both the CC training region and its corresponding enhanced training region facilitate the computing of the image features. For example, some geometric image features may be more easily computed using the CC training region, while others (such as color features) require the corresponding enhanced training region for computing, while still other features may make use of both.

In a preferred embodiment, for each training sample pair, three different categories of image features are computed for a total of 156 computed image features. In the preferred embodiment, the 156 image features are divided into the following three categories: 6 geometric features, 94 color features, and 56 edge features.

The 6 geometric features are computed for each training sample pair, i.e. for both printable-character training regions and non-character training regions. Theses geometric features may include, for example, the ratio between the number of foreground pixels within a training region (as determined for example by a CC training region) and the size (or area in pixels, or total pixels) of the training region. The 6 geometric features may also include the respective ratios between the width, height, and size of a training region and the width, height, and size of the entire (scanned) input training image within which the training image is defined. The geometric features may also include the ratio between the number of foreground pixels within a training region and the size (or area in pixels, or the total number of pixels) of the entire input training image within which the training image is defined. Still another geometric feature may be the aspect ratio of the training region (i.e., its defined bounding box). Since the data needed for these features (such as the total number of foreground pixels, the total size in pixels, and the dimensions of the training region, or its bounding box) may be attached as labels of each training region and/or scanned input image, these geometric features may be quickly computed using only labels of a training image, and thus have a very low computational cost.

The 94 color features may make use of the CC training region and its corresponding enhanced training region. Such color features may include, for example, the variance of colors of the pixels in the enhanced training region corresponding to the connected-component pixels and those of the bounding box of the enhanced training region. Another feature may be the mean color difference between pixels in the enhanced training region corresponding to the connected-component pixels and the bounding box of the enhanced training region. Still another example may be the mean color difference between each two bounds of the bounding box. A last example of a possible color feature may be the color distribution histogram inside an enhanced training region. Since these features use training region labels and colors directly, without any intermediary computations, the overall computation cost remains relatively inexpensive.

Figure 11A:
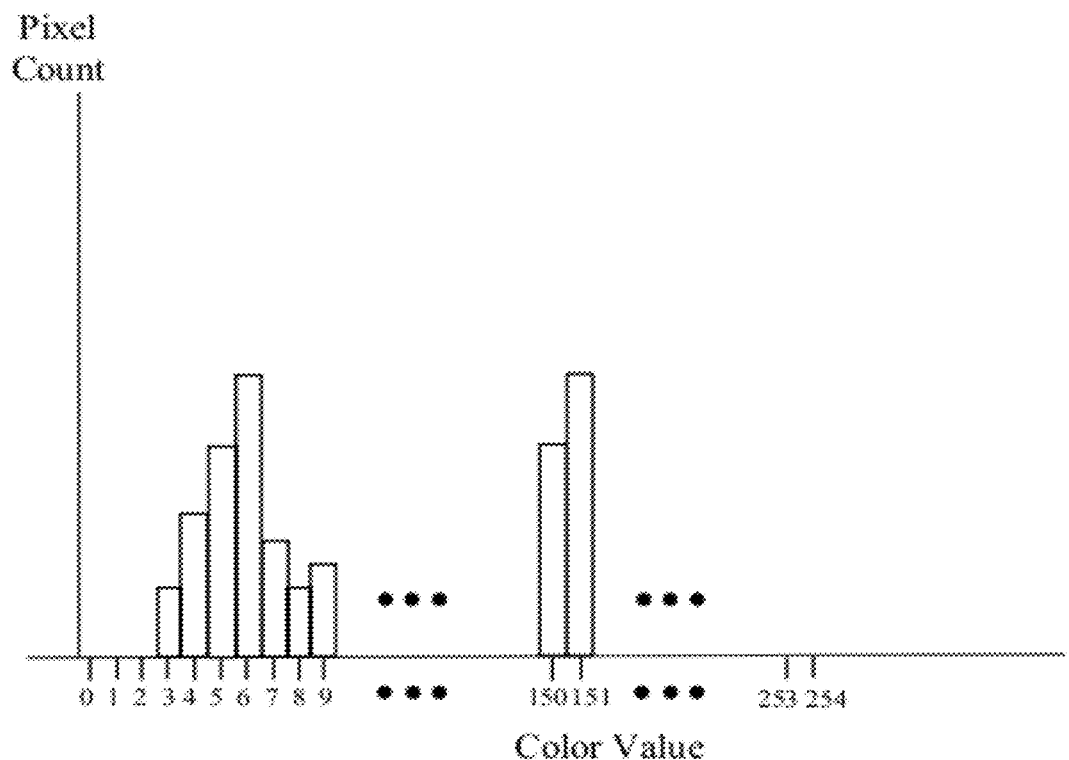
FIGS. 11A and 11B illustrate the construction of a histogram from the values obtained for an image feature characteristic statistic.

For illustrative purposes, an example of color histogram for a training region is shown in FIG. 11A. In the present case, the color ranges varies from 0 to 255, and the histogram indicates the number of pixels that have a given color value.

Figure 11B:
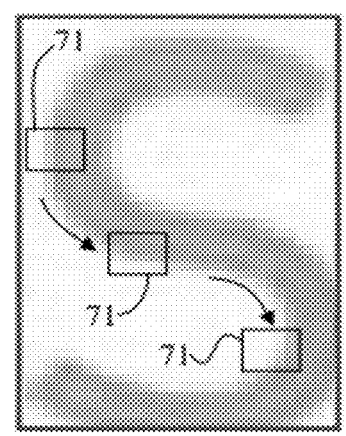

The last category, the 56 edge features, is the most computationally expensive since it does require intermediary processing of pixels in order to determine edge features. Examples of possible edge features are the means, variances, and distribution histograms of the edge amplitudes respectively on foreground and non-foreground pixels inside the bounding box. Another example may be the difference between the two sets of means and variance. These features require computing the edges of shapes, and thus have a higher computational cost, than the previous two categories of features. This is illustrate in FIG. 11B, where computing the edge of letter "S" is illustrated by a box 71 that moves along the edge of letter "S" and indicates the pixels that are preprocessed to determine the edge. Thus, determining edge features may require processing most, if not all, the pixels within a given training region.

In an example application of the presently preferred embodiment, forty-six scanned, input training images were used to create a plurality of training sample pairs. In one application, the forty-six scanned, input training images rendered about 95,000 printable-character training sample pairs (i.e. ≈95K positive samples) and about 171,000 non-character training sample pairs (i.e. ≈171K negative samples). The training sample pairs were used to "train", i.e. construct, a character classifier that distinguishes printable-character regions from non-character regions.

Before describing the preferred method of constructing and implementing the character classifier, it may be helpful to discuss prior methods of constructing a classifier.

With reference to FIG. 12A, an example of a simplified plotting of data points (or histogram of data value distribution) for a given feature (Feature) shows positive samples (i.e. feature data values corresponding to printable-character training regions) as positive signs "+", and negative samples (i.e. feature data values corresponding to non-character training regions) as negative signs "−". To construct a linear classifier, traditionally, one would identify a threshold value to divide the positive samples from the negative samples.

Using this approach, a linear classifier would be constructed by selecting a threshold value for distinguishing between printable-characters and non-characters. For example in FIG. 12B, all values greater than the threshold are deemed printable-characters, and all values lesser than the threshold are deemed non-characters. As can be seen, however, this does not provide the best division since there are several positive samples below the defined threshold value.

Another approach is to define multiple intervals of varying sizes by identifying multiple threshold values. In the example of FIG. 12C, any future test sample pair whose feature value falls within Interval 1 would be classified a printable-character. Similarly, all test sample pairs within Interval 2 would be classified non-characters, and all test sample pairs within Interval 3 would be classified printable-characters. This approach, however, requires additional computational processing and depends on the availability of clearly defined clusters of positive and negative samples with minimal overlap between clusters.

The presently preferred categories of features do not render such clean results. Therefore, the presently preferred approach defines a method of quickly and simply constructing weak classifiers for each feature, with each weak classifier being similar to a piece-wise linear classifier. A weak classifier is constructed from each of the computed features (i.e. from the computed histograms, for example) by dividing the range of the feature results into a predefined number of fixed-length intervals without regard for clustering data. Because each the weak classifiers do not take into consideration the clustering of positive and negative sample, each individual weak classifier may not be very reliable by itself at distinguishing printable-character regions from non-character regions. However, by appropriately combining a select number of these weak classifiers, and assigning suitable emphasis weights according to their accuracy, a reliable and strong character classifier can easily constructed.

Figure 13A:
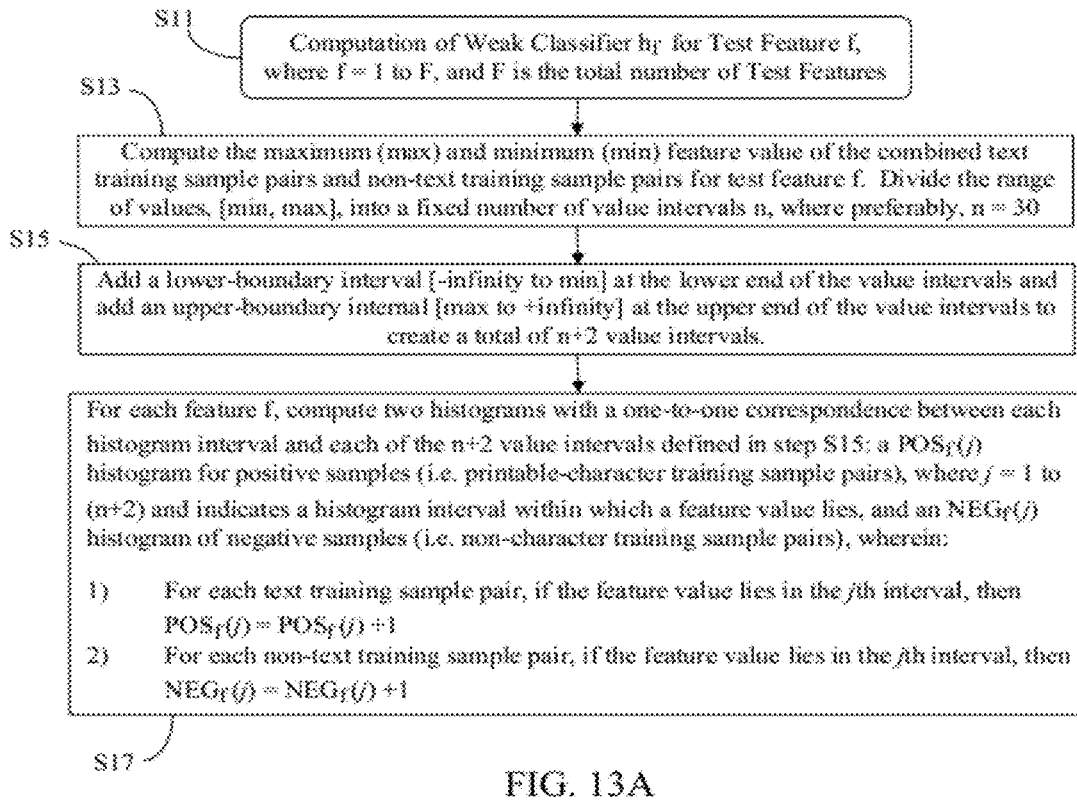
FIG. 13A illustrates initial steps in the creation of a weak classifier.
Figure 13B:
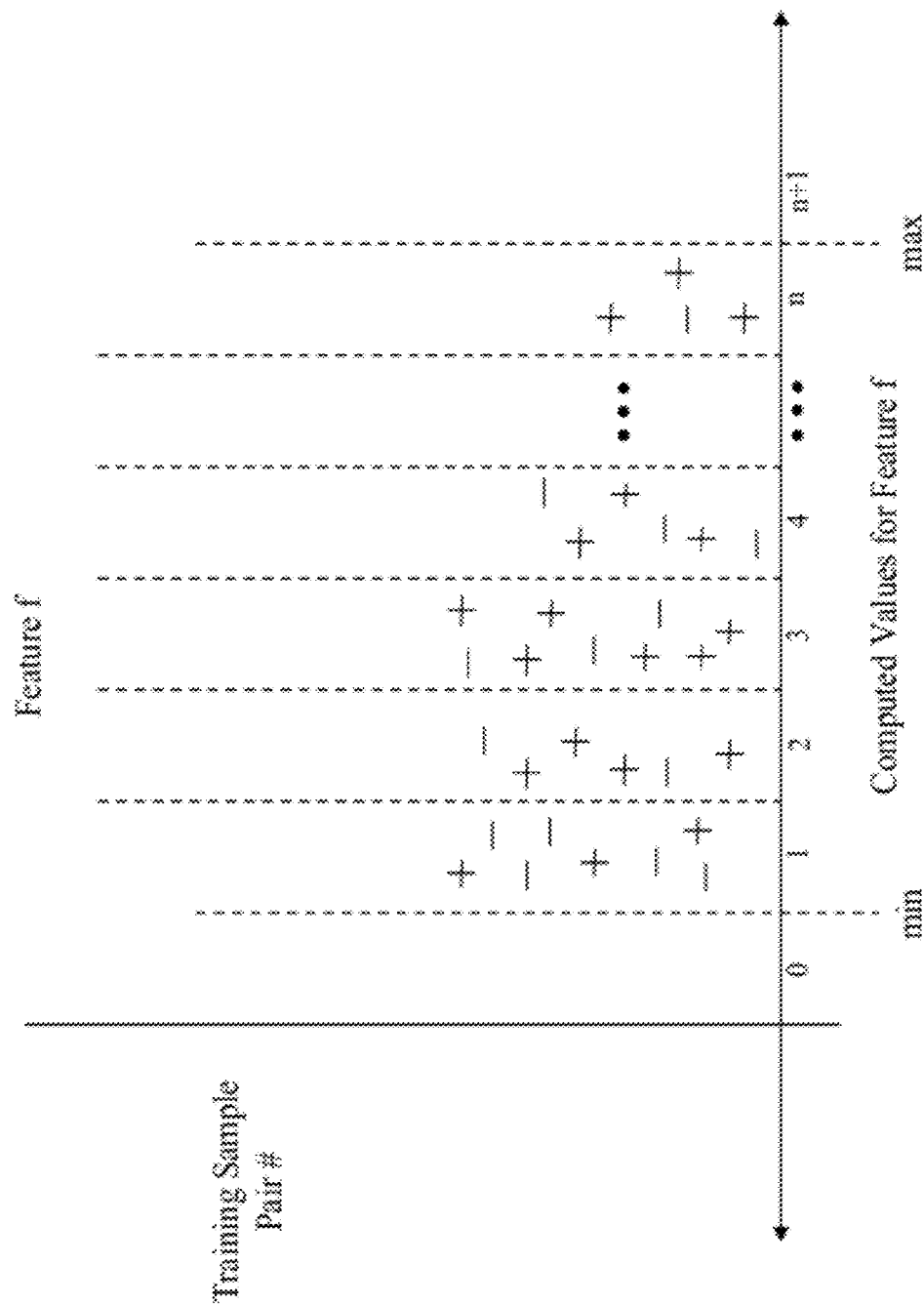
FIG. 13B illustrates the construction of a histogram in the creation of a weak classifier.

FIG. 13A provides an overview of a general method for constructing a weak classifier in accord with the present invention, and FIG. 13B is a pictorial representation of at least part of the steps described in FIG. 13A.

As is stated above, the image features may be divided into multiple categories, with each category having a different number of features. Also, although the presently preferred embodiment uses 156 features, a different number of total features may also be used. Therefore in the general presentation, it is assumed that a total number of F features are used, and the computed weak classifier for each, individual feature f (where f=1 to F) is identified as $h_f$ (step S11).

Once the values of a given feature f have been computed for a given group of training sample pairs (i.e. printable-character training sample pairs and/or non-characters training sample pairs), the maximum (max) and minimum (min) feature values are computed (step S13). Preferably, feature f is computed for all printable-character training sample pairs and all non-characters training sample pairs, the max and min values among all training sample pairs are determined. The value range from max to min is then divided into a fixed number n of equally-sized intervals, where n is preferably equal to 30.

This is illustrated in FIG. 13B, where positive and negative samples are again illustrated by +'s and −'s. Interval 1 begins at the minimum value, min, and interval n ends with maximum value, max. The value range from min to max is divided into equally sized intervals from 1 to n. If an interval has a greater number of positive samples, then it is designated a positive interval, and for classification purposes, and test sample pair whose feature values fall within that interval is classified as printable-character. Conversely, if an interval has a greater number of negative samples, then it is designated a negative interval, and for classification purposes, and test sample pair whose feature values fall within that interval is classified as non-character.

As is indicated in step S15 and illustrated in FIG. 13B, a lower-boundary interval 0, which ranges from −infinity to min, is added at the lower end of the value intervals (i.e. below and adjacent interval 1). Similarly, an upper-boundary internal (n+1), which ranges from max to +infinity, is added at the upper end of the value intervals (i.e. above and adjacent interval n). Thus, the total number of intervals is n+2.

For each interval, if the number of negative samples is greater than the number of positive samples, then that interval is designated negative. Also for each interval, if the number of positive intervals is greater than the number of negative samples, then that interval is designated positive. If the number of positive and negative samples are equal, then that interval may be designated positive, be default. This creates a piece-wise linear, weak classifier since it does attempt to separate positive sample clusters from negative sample clusters. Instead, it arbitrarily divides the samples into fixed segments, and classifies data base on whether a segment has a majority of positive or negative samples.

A method of computationally creating this type of weak classifier is described in step S17. For each feature f, two histograms are computed with a one-to-one correspondence between each histogram interval and each of the n+2 value intervals defined in step S15. A first histogram $POS_f(j)$ is a histogram of positive samples (i.e. histogram of computed value results for printable-character training pairs). In the present case, j, indicates the histogram interval within which a feature value lies, and thus j ranges from 0 to (n+1) since there are a total of n+2 intervals. The second histogram $NEG_f(j)$ is a histogram of negative samples (i.e. histogram of computed value results for non-character training pairs). Again, j, indicates the histogram interval within which a feature value lies, and j ranges from 0 to (n+1) since there are a total of n+2 intervals. In constructing histograms $POS_f(j)$ and $NEG_f(j)$, one may follow the following routine:
1) For each printable-character training sample pair, if a currently computed feature value lies in the jth interval, then $POS_f(j)=POS_f(j)+1$, and
2) For each non-character training sample pair, if a currently computed feature value lies in the jth interval, then $NEG_f(j)=NEG_f(j)+1$.

Figure 14:
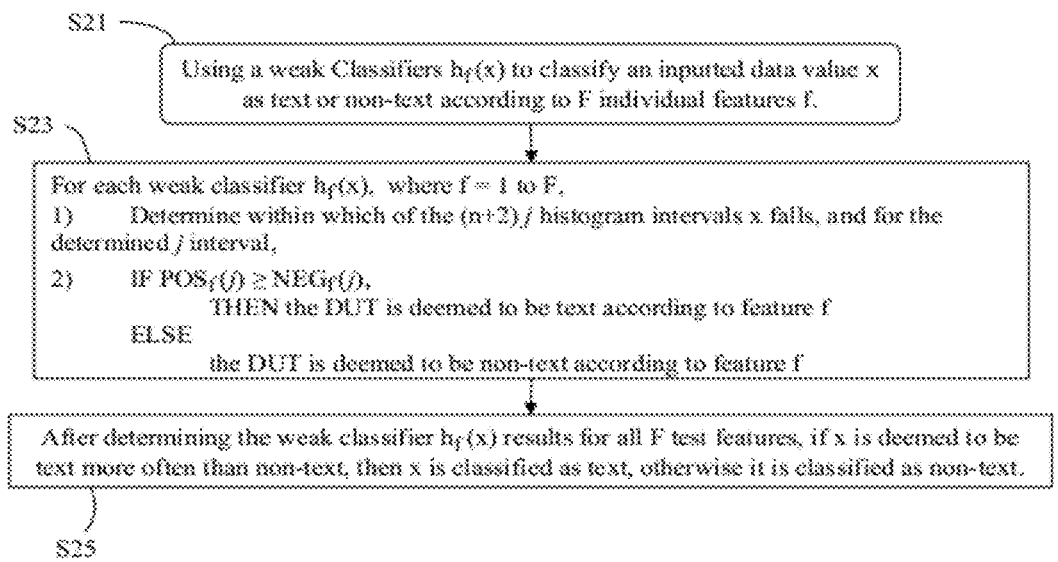
FIG. 14 illustrates how to combine the histograms of the plurality of training sample pairs in the creation of a weak classifier for a given image feature characteristic statistic.

Having constructed a weak classifier for a given feature f, FIG. 14 indicates how the weak feature may be used to classify a given inputted data value x (i.e. feature value computed from a submitted test image (such as a submitted image region)) to be classified as either a printable-character or a non-character (step S21).

This is achieved by determining in which interval the newly received data value x falls, and then determining if that interval has deemed positive or negative. If it has been deemed positive, then data value x is deemed to be a printable-character. If it has been deemed negative then data value x is deemed to be non-printable. Step S23 combining the determination of whether the interval to which data value x belongs has are greater number of positive samples or negative samples to determined to determine whether to classify data value x as printable-character or as non-printable-character. Basically, for each weak classifier $h_f(x)$, where f=1 to F, one
1) Determines within which of the (n+2) j histogram intervals x falls, and for the determined j interval, and
2) IF $POS_f(j) \geq NEG_f(j)$,
  THEN the data under test (i.e. DUT) is classified as a printable-character according to feature f
  ELSE
  the DUT is classified as a non-character according to feature f.

In one embodiment of the present invention, after computing all F features for DUT x, if DUT x was classified as a printable-character more often than classified as a non-character, then it is deemed to be a printable-character. Otherwise it is deemed to be a non-character (step S25).

Figure 15:
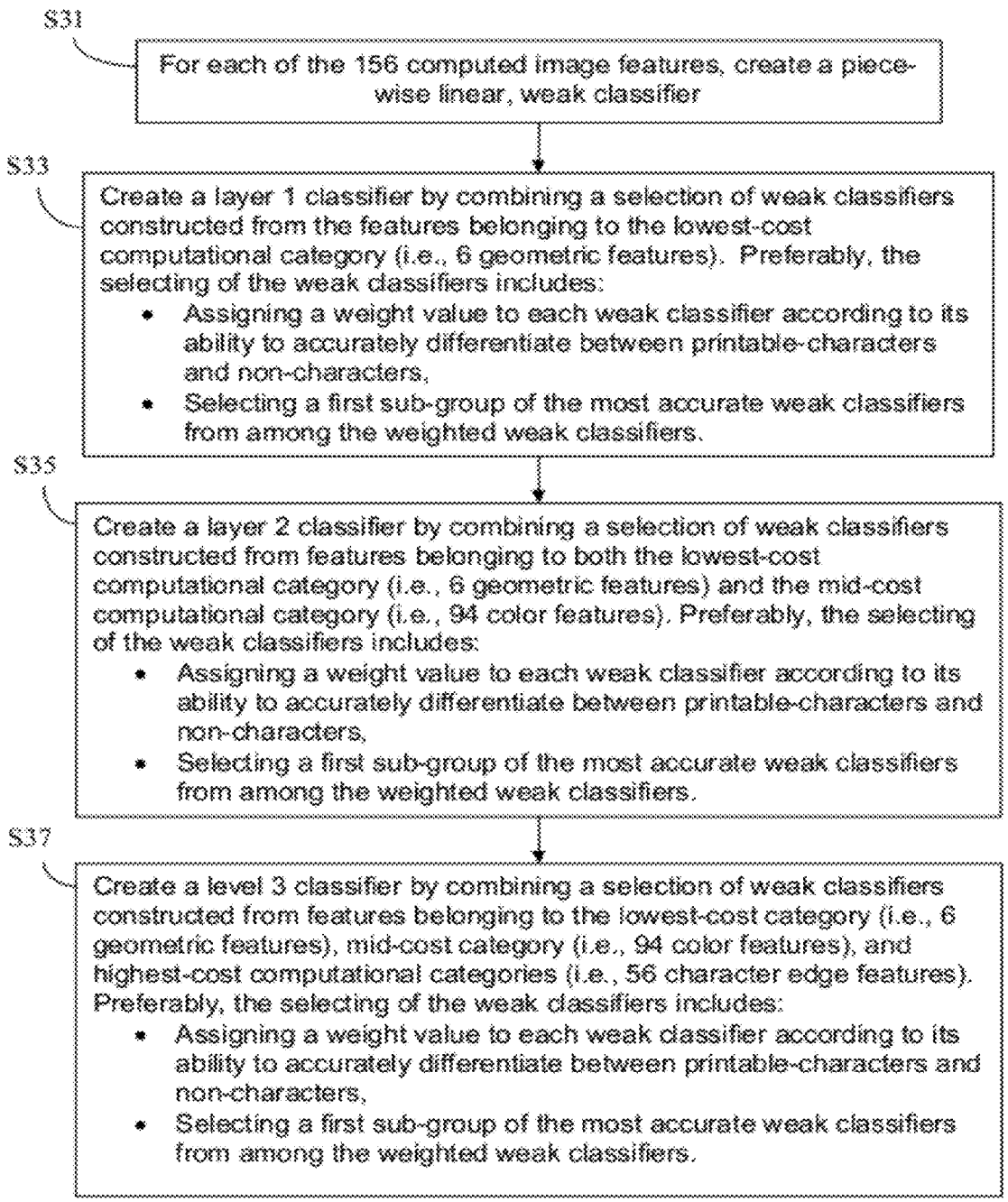
FIG. 15 provides an overview in the definition of a level 1, level 2 and level 3 classifier, each of which is created by combining multiple, select weak classifiers from defined categories according to computing cost.

Although this approach does combine the results of all F weak classifiers, as is explained above, some classifiers may be better than others at distinguishing printable-characters from non-characters. Therefore, a preferred embodiment for combining the plurality of weak classifier into a character classifier takes a more involved approached that weighs each of the F features according to its individual ability to distinguish printable-characters from non-characters, and then to combines the best of the weighted features to construct the final character classifier. An overview of this general approach is described in FIG. 15.

Basically, the process is divided into three layers: layers 1 to layer 3. At layer 1, a layer 1 classifier is created by combining a selection (i.e. a set) of weak classifiers constructed from the features belonging to the lowest-cost computational category (step S31). As is explained above, in the presently preferred embodiment, the lowest-cost computational category consists of 6 geometric features. Therefore, the layer 1 classifier is created by combining a selection (i.e. set) of weak classifiers from among the 6 geometric weak classifiers (from all of the lowest-cost computational category).

Preferably, the process of defining this set of weak classifiers from among all the weak classifiers corresponding to the lowest-cost category includes assigning a weight value to each weak classifier within the lowest-cost category according to its ability to accurately differentiate between printable-characters and non-characters. If desired, the assigned weight value may be made relative to the other weak classifiers within the same lowest-computational cost category, or may be based on a linear scale of accuracy rate. The set of weak classifiers are selected from among better-performing, weighted weak classifiers.

At layer 2, a layer 2 classifier is created by combining a selection of weak classifiers constructed from features belonging to both the lowest-cost computational category and the mid-cost computational category (step S35). As is explained above, the mid-cost computational category preferably consists of 94 color features. Thus, the layer 2 classifier is created by combining a selection of weak classifiers from among the 6 geometric weak classifiers (from the lowest-cost computational category) and the 94 color weak classifiers (from the mid-cost computational category).

Like before, the process of defining a selection of weak classifiers from among the weak classifiers corresponding to the lowest-cost and mid-cost categories preferably includes assigning a weight value to each weak classifier within the lowest-cost and mid-cost categories according to its ability to accurately differentiate between printable-characters and non-characters. If desired, the assigned weight value may be made relative to the other weak classifiers, or may be based on a linear scale of accuracy rate. The selection of weak classifiers is made from among better-performing, weighted weak classifiers.

At layer 3, a layer 3 classifier is created by combining a selection of weak classifiers constructed from features belonging to the lowest-cost, mid-cost, and highest-cost computational categories (Step S37). As is explained above, the highest-cost computational category preferably consists of 56 character edge features. Thus, the layer 3 classifier is created by combining a new set of weak classifiers selected from among the 6 weak classifiers from the lowest-cost computational category, the 94 weak classifiers from the mid-cost computational category, and the 56 weak classifiers form the highest-cost computational category.

If desired, the process of defining a selection of weak classifiers from among the weak classifiers corresponding to the lowest-cost, mid-cost, and highest-cost categories may include assigning a weight value to each weak classifier within the lowest-cost, mid-cost, and highest-cost categories according to its ability to accurately differentiate between printable-characters and non-characters. Like before, the assigned weight value may be made relative to the other weak classifiers, or may be based on a linear scale of accuracy rate. The selection of weak classifiers is made from among better-performing, weighted weak classifiers.

Within each of method of creating a layer classifier (steps S33 to S37), irrespective of whether it a layer 1 classifier, a layer 2 classifier, or a layer 3 classifier, the process of combining it respective number of weak classifier is similar, with only the number of weak classifiers being different. For example, when creating the layer 1 classifier, 6 different weak classifiers (corresponding to the 6 geometric features) are processed. Similarly, the layer 2 classifier processes 100 weak classifiers corresponding to 6 geometric features and 94 color features. Likewise, the layer 3 classifier processes 156 weak classifiers corresponding to 6 geometric features, 94 color features, and 56 character edge features. Thus, to create each layer classifier, only the total number of weak classifiers processed changes: from 6 different weak classifiers (corresponding to 6 features) for the layer 1 classifier, to 100 weak classifiers (corresponding to 100 features) for the layer 2 classifier, to 156 weak classifier (corresponding to 156 features) for the layer 3 classifier. Therefore, a general process for the construction of a layer classifier (irrespective of the total number of weak classifiers processed in its construction) is provided, with the understanding that the number of weak classifiers processed corresponding to the number of features F associated with a particular layer.

Figure 16B:
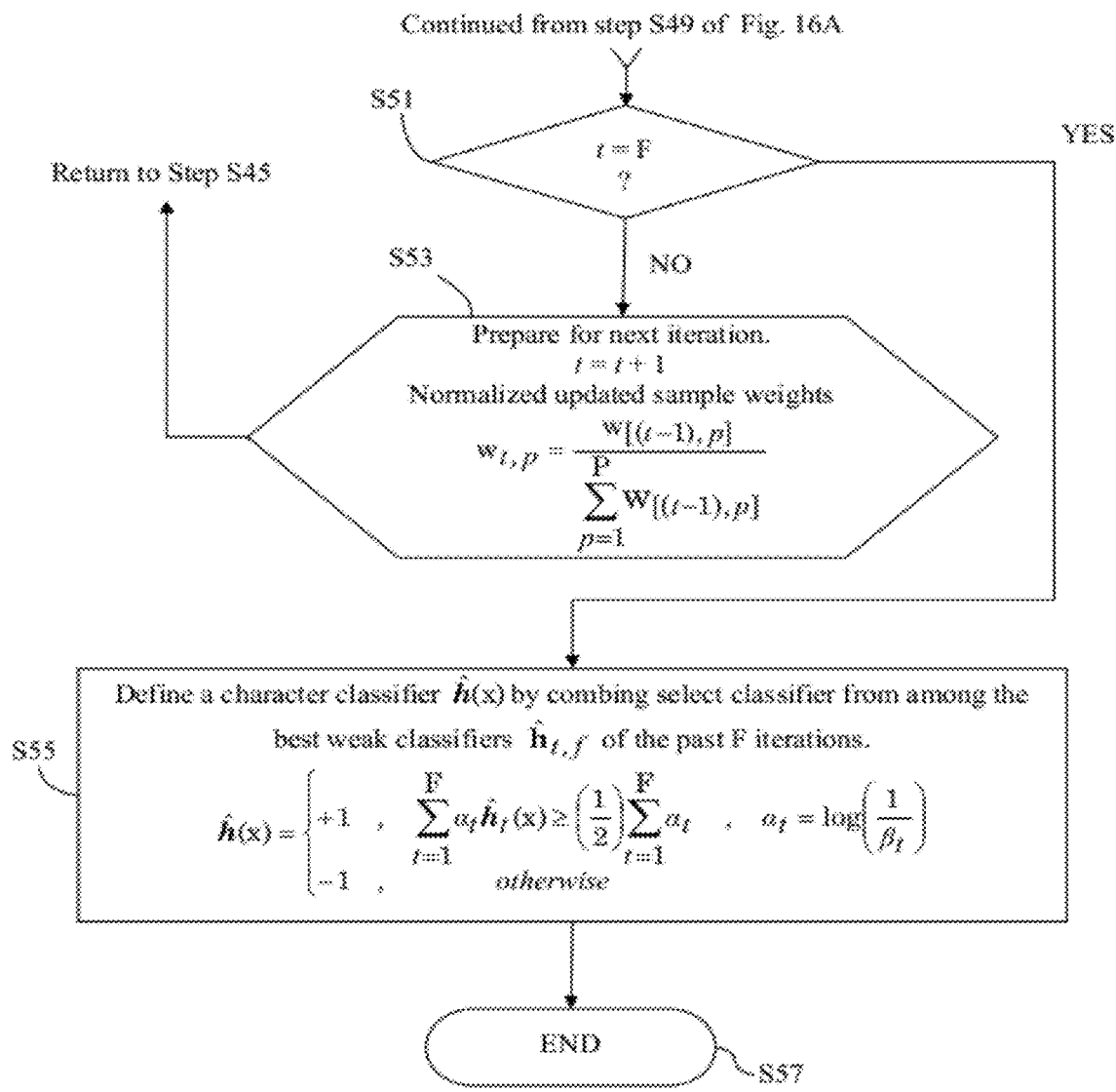

FIGS. 16A and 16B describe the general process for creating a level classifier constructed by combining a group of weak classifiers selected from a pool of F weak classifiers, each of which is, in turn, constructed from a corresponding one of F image features (S541). That is, the selection is made from among F weak classifiers, one per image feature f. The present embodiment assumes that the F image features are computed using P training samples.

As is explained above, the presently preferred embodiment assigns a weight to each weak classifier based in its ability to accurately differentiate printable-characters from non-characters. Thus a first part of the process is to test the individual weak classifiers and assign a weight based on its test results. However, before testing each weak classifier, it is further preferred that each be assigned a starting weight. This starting weight is then adjusted upward or downward as its testing progresses. As is also explained above, each image feature f is computed for each of the P training samples. Since the weak classifiers are constructed from the results obtained from computing a feature f for a collection of training sample pairs, a preferred method of assigning an initial weight to each weak classifier is to assign a weight to each training sample pair. It is assumed that the larger a sample pair is (i.e. the larger the area of its training region), the greater the amount of information it provides and thus the greater the weight assigned to it. Therefore, one of the initial steps is to assign a weight $w_p$ to each individual training sample pair p, based on its size (i.e. its training region area) relative to the sum of the sizes of all P training sample pairs.

The following process is repeated, i.e. iterated, F times, one iteration per image feature f. An iteration counter t is maintained track a current iteration count, and the process is repeats until t=F.

Before the initial iteration, step S43 initializes the process by setting iteration counter t to 0, and assigning individual weights $w_p$ to each of the P training sample pairs. The weights are preferably assigned according to the following relation:

$$w_p = \frac{\text{area of training sample pair } p}{\text{sum of the areas of all } P \text{ training sample pairs}}$$

Assuming that the F weak classifiers have been constructed, incorporating the assigned weight $w_p$ of each training sample pair, the F weak classifiers are now tested in a series of F iterations. An iteration begins by determining the error of each weak classifier (step S45). That is, each weak classifier $h_f$ (where f=1 to F) is tested by determining its accuracy at assigning a text label x to each of the P training sample pairs, where text label x may be a numerical +1 indicating a printable-character label, or may be a numerical −1 indicating non-character label. Formulation $h_f(x_p)$ indicates that weak classifier $h_f$ assigned text label $x_p$ to sample pair p. Assuming that the true text label of a given sample pair p is $y_p$, then the error of a weak classifier when classifying the given sample pair p is $(h_f(x_p)-y_p)$. It is preferred, however, that this error value be multiplied by the weight $w_p$ of the current sample pair for the current iteration (recalling that the weight $w_p$ of each sample pair is adjusted during each iteration). The weight of the given sample pair p during iteration t is denoted $w_{t,p}$. The final classification error of a given weak classifier $h_f$ during a current iteration t is denoted $\epsilon_{t,f}$, and it is the sum of the absolute values of all the error results obtained when applying the given weak classifier $h_f$ to all the P sample pairs. Thus, classification error $\epsilon_{t,f}$ for each weak classifier $h_f$ for a current iteration t is computed as $$\varepsilon_{t,f} = \sum_{p=1}^{P} w_{t,p} |(h_f(x_p) - y_p)|$$

where f=1 to F.

The next step is to select the best weak classifier $\hat{h}_{t,f}$ among all F weak classifiers $h_1$ to $h_F$ within current iteration t (step S47). Preferably, the best classifier $\hat{h}_{t,f}$ for the current iteration is defined as the weak classifier within the current iteration that rendered the smallest classification error $\epsilon_{t,f}$ (i.e. that rendered the smallest $\epsilon_{t,f}$ in step S45). In other words, $\hat{h}_{t,f}$ is the weak classifier $h_f(x_p)$ that rendered the minimum $\epsilon_{t,f}$.

In step S49, the weights $w_{t,p}$ for each of the P test sample pairs are updated, as follow:

$$w_{t,p} = w_{t,p} \times \beta_t^{(1-e_p)}$$

where $$e_p = \begin{cases} 0, & \hat{h}_{t,f}(x_p) = y_p \\ 1, & \text{otherwise} \end{cases}, \text{ and } \beta_t = \frac{\varepsilon_t}{1-\varepsilon_t},$$

and $\epsilon_t$ is the average of all $\epsilon_{t,f}$. That is, $$\varepsilon_t = \frac{\sum_{f=1}^{F} \varepsilon_{t,f}}{F}.$$

One now determines if the current iteration t is the last iteration (step S51). If it is, (i.e. t=15), then the process proceeds to step S55.

In step S55, the final character classifier $\hat{h}(x)$ is defined by combining select classifiers from among the best weak classifiers $\hat{h}_{t,f}$, as determined within each of the previous F iterations. Preferably, this is done by following the following relation:

$$\hat{h}(x) = \begin{cases} +1, & \sum_{t=1}^{F} \alpha_t \hat{h}_t(x) \geq \left(\frac{1}{2}\right) \sum_{t=1}^{F} \alpha_t, \quad \alpha_t = \log\left(\frac{1}{\beta_t}\right) \\ -1, & \text{otherwise} \end{cases}$$

where +1 indicates that the corresponding weak classifiers $\hat{h}_{t,f}$ is incorporated in character classifier $\hat{h}(x)$, and −1 indicates that the corresponding weak classifier $\hat{h}_{t,f}$ is not incorporated into character classifier $\hat{h}(x)$.

However, if the current iteration t is not the last iteration (i.e. t≠F), then preparations are made for the next iteration (step S53). First, iteration counter t is incremented by one. Then the updated weights computed in step S49 are normalized. This is preferably achieved by dividing each updated weight by the sum of all the updated weights. It is noted that although the weights were updated toward the end of the current iteration (in step S49), the normalized weights are to be used in the next iteration. Since iteration counter t has already been incremented in preparation for the next iteration, the normalized weights are referenced using updated iteration counter t (i.e. assigned to $w_{t,p}$), but the updated weights are referenced by using the value of iteration counter t before it was incremented, as follows:

$$w_{t,p} = \frac{w_{[(t-1),p]}}{\sum_{p=1}^{P} w_{[(t-1),p]}}$$

As is explained above, the process of FIGS. 16A and 16B is preferably used to create a level 1 character classifier, a level 2 character classifier, and a level 3 character classifier. The level 1 classifier is created using the features from the lowest-cost computational category, and thus F=6 in this case (i.e. 6 geometric features total in the preferred embodiment). The level 2 classifier is created using the features from the lowest-cost computational category and the mid-cost computational category includes, and thus F=100 in this case (i.e. 6 geometric features and 94 color features in the preferred embodiment). Finally, the level 3 classifier is created using the features from the lowest-cost computational category, the mid-cost computational category, and the highest-cost computational category, and thus F=156 in this case (i.e. 6 geometric features, 94 color features, and 56 character edge features in the preferred embodiment).

The level 1, 2, and 3 character classifiers have increasing levels of complexity and computational requirements, and also increasing levels of reliability at accurately distinguishing printable-character regions from non-character regions. It has been found that in generally, when the present characters classifiers error, they produce false positives. That is, generally when they reject a test region as being a non-character region, this decision will generally be accurate. However, test regions identified as printable-characters may include a mixture of both printable-character and non-character regions. The preferred method of utilizing the level 1, 2, and 3 character classifiers takes advantage of this observation to increase the speed with which an input image is processed to identify printable-character regions.

Figure 17:
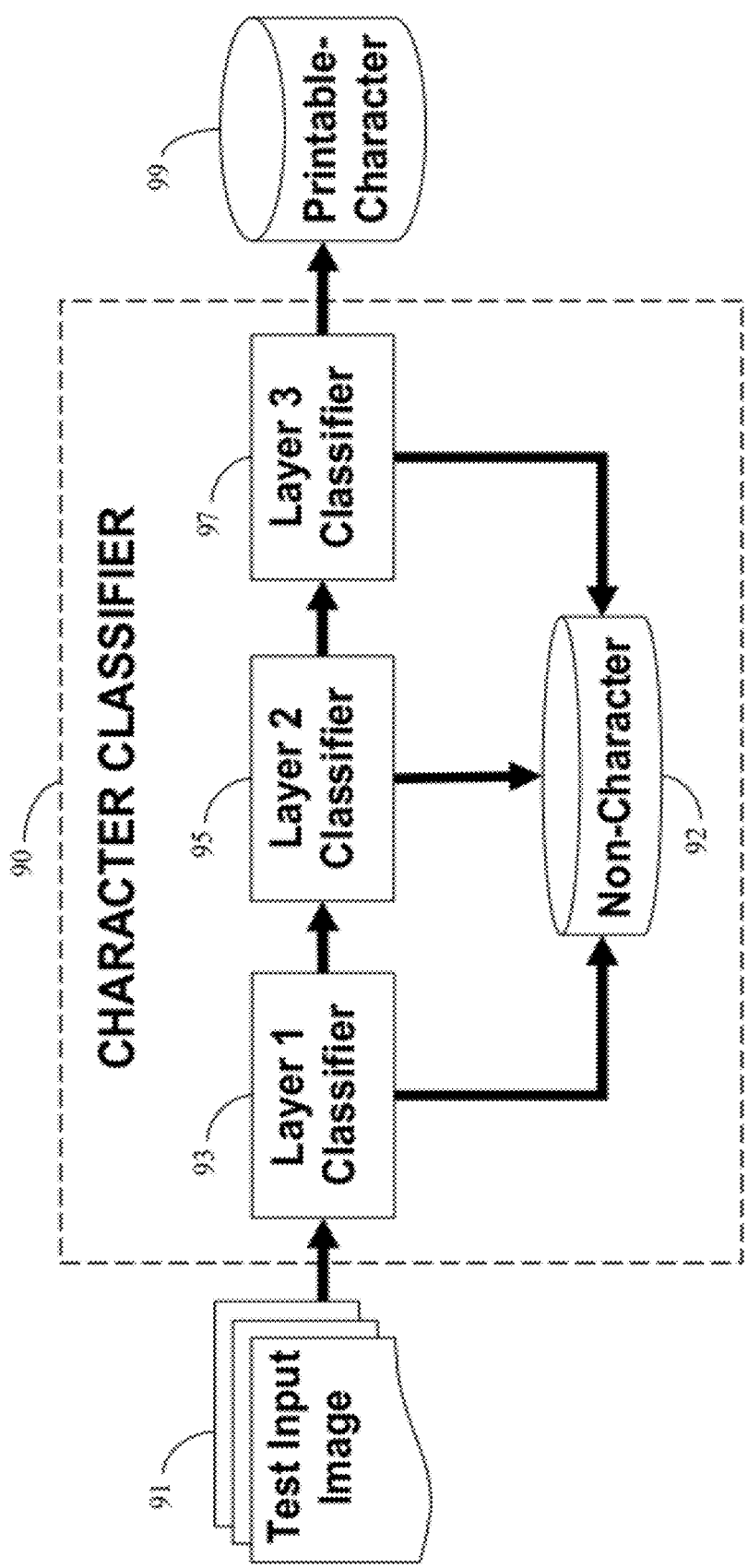
FIG. 17 is an overview of the implementation of a character classifier in accord with the present invention.

With reference to FIG. 17, the preferred final character classifier is comprised of all three level 1, level 2, and level 3 character classifiers. First, an input image that is to be processed to identify printable-character regions is preprocessed in any preferred method, not shown. This may include, for example, enhancing the image and dividing it into a plurality of test regions. It is preferred, however, that connected-components be created in order to create a connected-component input image (optionally segmented) and corresponding to the (optionally enhanced) input image to create a (optionally segmented) pair, such as is described above.

The input image 91 is preferably preprocessed prior to being applied to character classifier 90. Preferably, processing of input image 91 may include enhancing the image such as by smoothing and cleaning, dividing input image 90 into multiple regions of interest of varying sizes, labeling foreground pixels, and computing connected-components from the foreground labels. Is region of interest, which is preferably comprised of a connected-component part and a corresponding enhanced image part, is applied to present character classifier 90.

Preferable, character-classifier 90 is comprised of a level 1 classifier 93 in sequence with a level 2 classifier 95 in sequence with a level 3 classifier. As is explained above, level 1 classifier 1 operates on the connected-components of input image 90, and is very quick since it is comprised of small number of geometric feature classifiers. Those regions of input image 91 which are classified as non-characters regions by level 1 classifier are designated as non-text, as is indicated by box 92, and are excluded from further processing within character-classifier 90. The remaining regions that layer 1 classifier 93 identified as printable-regions are then submitted to level 2 classifier 95 for further classification.

Level 2 classifier 95 applies a combination of geometric feature and color feature classifiers, and those regions of input image 91 that level 2 classifier 95 identifies as non-character regions are designated as non-text, as is indicated by box 92, and are excluded from further processing within character-classifier 90. The remaining regions that layer 2 classifier 95 identified as printable-regions are then submitted to level 3 classifier 97 for further classification. The remaining regions that layer 2 classifier 95 identified as printable-regions are then submitted to level 3 classifier 97 for further classification.

Level 3 classifier 97 applies a combination of geometric feature, color feature, and character edge feature classifiers, and those regions of input image 91 that level 3 classifier 97 identifies as non-character regions are designated as non-text, as is indicated by box 92, and are excluded from further processing within character-classifier 90. The remaining regions that layer 3 classifier 97 identified as printable-regions are then designated as printable-characters, as is indicated by box 98. The image regions designated as printable-characters may then be submitted to a character-recognition process to identify specific characters.

Although the present character classifier 90 subjects an input image to three internal characters classifiers, 93-97, only layer 1 classifier 93 is applied to all relevant regions of input image 91, and since layer 1 classifier 93 is relatively quick, requiring only access to specific CC labels of each region to be processed, it places a very light computing burden on the entire process. Level 2 classifier 95 requires access to the enhanced image to process color features, and thus is more computationally intensive, but it is applied to only a sub-set of all relevant regions of input image 91 and it does not require preprocessing image pixels in order to obtain relevant data for classification. Although level 3 classifier 97 is computationally extensive, requiring pre-processing of image pixels within a region interest to classify character edge features, is applied to an even smaller subset the relevant regions of input image 91.

Furthermore, computation-consuming regions, such as large regions or regions having rich textures, are often eliminated as non-text regions by layer 1 classifier 93 or layer 2 classifier 95, and thus the regions submitted to layer 3 classifier 97 are generally smaller and thus easier to process. Thus, layer 3 classifier 97, which is the most computationally expensive, deals with the least amount data. Consequently, the overall classification process is computationally efficient, and character classifier 90 can process an input image 91 to identify printable-character regions more quickly than prior art approaches.

The presently preferred embodiment was implemented in an experiment using 46 training input images to create character-classifier 90, and character-classifier 90 was applied to 36 testing images. The 46 training input images rendered about 95K positive (printable-character) samples and about 171K negative (non-character) samples. Excluding time for preprocessing operations such as image enhancement and foreground labeling, the execution time character classifier 90 depends on the number of connected-components an input test image. In the present experiments execution of character classifier 90 varied from 0.5 seconds to 3 seconds when executed on a 3.4 GHz, Pentium® 4-based personal computer. The test results showed that the present invention achieved a detection rate about 96.42% (i.e. positive samples correctly identified as positive). The resultant false-positive rate (i.e., negative samples being erroneously identified as positive) was about 14.29%. As it is known in the art, the subsequent character recognition processes would have techniques for handling false positive regions.

The identified character regions are then submitted to a character recognition process to provide character labels identifying the specific printable-characters.

In an added application of the present invention, the present invention was applied to a PDF file generation method. The character labels identified were used as foreground to generate high compression, high quality PDF file representation of an input image. On average, the present approach achieved over 20% smaller PDF size than previous a used method. For example, when 82 test input images were subjected to the previous method of PDF encoding, the resultant PDF files had an average size of 12.8 MB. Using the present method of identifying text labels, and using the text labels as foreground information, reduced to the average size of the generated PDF files to 10 MB, while maintaining a similar quality.

The detected text labels are used as foreground to generate high compression high quality PDF. In average we achieved over 20% smaller PDF size than our recent release of DoCom, 12.8 MB reduced to 10 MB for 82 images, with the similar quality.

Thus, the present invention provides a promising performance on identifying printable-characters in scanned document images. Compared to previous foreground labeling techniques, the present invention also achieves a greatly reduced false-positive rate. The present invention also achieved better results for related applications, such as high compression high quality PDF generation. On average, using the present invention resulted in file size reduction of over 20%, as compared to previous methods.

It is to be understood that the present invention may also be used in other related applications. Such related applications may be watermarking, OCR, outlined PDF, high compression high quality PDF generation, layout extraction, watermarking (invisible: texts and photos, visible: background), hiding or manipulating text images for privacy or security, and presentation/whiteboard video recording (high text quality, hide text, or edit text content).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of identifying regions of an input image that contain human-readable, printable characters, said method comprising the following steps;
    (1) providing a plurality of training images having foreground pixels, said training images having printable-character regions containing examples of said printable characters and non-character regions not containing examples of said printable characters;
    (2) for each of said training images, applying the following steps:
        (a) identifying printable-character regions and non-character regions, each identified printable-character region and identified non-character region being designated a training region;
        (b) constructing a connected components (CC) region for each training region by constructing connected components of the foreground pixels in each training region, each CC region and its corresponding training region from which it is constructed constituting a training sample pair;
        (c) computing a plurality of image feature characteristic statistics for each training sample pair, wherein each image feature characteristic statistic provides distinguishing information of each sample pair;
    (3) defining a character classifier block using said image feature characteristic statistics, said character classifier block including at least a level 1 classifier sub-block, a level 2 classifier sub-block and level 3 classifier sub-block, each classifier sub-block classifying a received image region as a printable-character region or as a non-character printable regions, wherein said level 2 classifier sub-block has a greater computational cost than said level 1 classifier sub-block, and said level 3 classifier sub-block has a greater computational cost than said level 2 classifier sub-block;
    (4) extracting a plurality of test sample pairs from said input image, each test sample pair including a test image region of said input image and a test CC region constructed from the test image region;
    (5) submitting said plurality of test sample pairs to said character classifier block, wherein:
        the level 1 classifier sub-block receives for classification all of said plurality of test sample pairs;
        the level 2 classifier sub-block receives for classification test sample pairs classified as printable-character regions by the level 1 classifier sub-block and does not receive any test sample pairs classified as non-character regions by the level 1 classifier sub-block; and
        the level 3 classifier sub-block receives for classification test sample pairs classified as printable-character regions by the level 2 classifier sub-block and does not receive any test sample pairs classified as non-character regions by the level 2 or level 1 classifier sub-blocks; and
    (6) designating the test image regions of the test sample pairs classified as printable-character regions by the level 3 classifier sub-block as the regions of the input image that contain human-readable, printable characters.

2. The method of claim 1, wherein said human-readable, printable characters include at least one of text characters and Asian printable characters.

3. The method of claim 1, wherein in step (a), the printable-character regions and non-character regions are identified manually.

4. The method of claim 1, wherein step (2) further includes the following step after step (c):
(d) grouping said image feature characteristic statistics into a plurality of categories according to their respective computational cost, wherein the image feature characteristic statistics in teach category have a similar computational cost, arranging said categories into a sequence of increasing computational cost.

5. The method of claim 4, wherein in (d),
said plurality of categories are three categories defined as a geometric feature category computed from the CC training region of each training sample pair, a color feature category, and a character edge feature category; and
said geometric feature category is first, said color feature category is second, and said character edge category is third in said sequence of increasing computational cost.

6. The method of claim 4, wherein in step (3), the construction of said character classifier block including the following steps:
(i) constructing a separate weak classifier for each image feature characteristic statistic, wherein each weak classifier classifies an image region as a printable-character region or as a non-character regions based on the computed results of its corresponding image feature characteristic statistic;
(ii) constructing said level 1 classifier sub-block by combining a first plurality of weak classifiers corresponding to image feature characteristic statistics in categories not higher than in a first category in said sequence of increasing computational cost;
(iii) constructing said level 2 classifier sub-block by combining a second plurality of weak classifier corresponding to image features characteristic statistics in categories not higher than a second category in said sequence of increasing computational cost, said second category being higher than said first category in said sequence of increasing computational cost;
(iv) constructing said level 3 classifier sub-block by combining a third plurality of weak classifier corresponding to image features characteristic statistics in categories not higher than a third category in said sequence of increasing computational cost, said third category being higher than said second category in said sequence of increasing computational cost.

7. The method of claim 6, wherein:
said level 1 classifier sub-block combines weak classifiers corresponding to image feature characteristic statistics selectable from said first category and any other category below said first category in said sequence of increasing computational cost;
said level 2 classifier sub-block combines weak classifiers corresponding to image feature characteristic statistics selectable from said second category and any other category below said second category in said sequence of increasing computational cost; and
said level 3 classifier sub-block combines weak classifiers corresponding to image feature characteristic statistics selectable from said third category and any other category below said third category in said sequence of increasing computational cost.

8. The method of claim 6, wherein there are F image feature characteristic statistics, each image feature statistic is termed f, in turn, below where f=1 to F, and in step (i), the constructing of each separate weak classifier, $h_f$, includes the following steps applied to each image feature characteristic statistic f:
identifying the maximum (max) and minimum (min) value of image feature characteristic statistic f from step (c);
dividing the range of values, [min, max], into a fixed number of value intervals n;
adding a lower-boundary interval [−infinity to min] at the lower end of the value intervals and adding an upper-boundary internal [max to +infinity] at the upper end of the value intervals to create a total of n+2 value intervals;
defining a positive histogram comprised of the computed results from step (c) for image feature characteristic statistic f corresponding to training sample pairs defined from printable-character regions;
defining a negative histogram comprised of the computed results from step (c) for image feature characteristic statistic f corresponding to training sample pairs defined from non-character regions;
wherein said positive histogram and said negative histogram have a one-to-one correspondence between histogram value intervals, and each histogram has n+2 value intervals, the value intervals within the positive histogram of image feature characteristic statistic f being identifiable as $POS_f(j)$ where j=1 to (n+2), and the value intervals within the negative histogram of image feature characteristic statistic f being identifiable as $NEG_f(j)$ where j=1 to (n+2);
the defining of said positive histogram include, for each image feature characteristic statistic f corresponding to training sample pairs defined from printable-character regions, if the feature value lies in the jth interval, then $POS_f(j)=POS_f(j)+1$; and
the defining of said negative histogram include, for each image feature characteristic statistic f corresponding to training sample pairs defined from non-character regions, if the feature value lies in the jth interval, then $NEG_f(j)=NEG_f(j)+1$.

9. The method of claim 8, wherein n=30.

10. The method of claim 8, wherein in operation when receiving a test sample region for classification, the value of each image feature statistic f of the test sample region computed in turn is termed x, and the processing of $h_f(x)$ includes:
for each weak classifier $h_f(x)$, where f=1 to F,
determine within which of the (n+2)/j histogram intervals x falls, and for the determined j histogram interval,
IF $POS_f(j) \geq NEG_f(j)$, THEN the x is deemed a printable-character region according to image feature statistic f;
ELSE the x is deemed a non-character region according to image feature statistic f;
and after determining $h_f(x)$ for all F image feature statistics, if x is deemed a printable-character region more often than a non-character region, then the test sample region is classified as a printable-character region, otherwise the test sample region is classified as non-character region.

11. The method of claim 6, wherein:
step (i) further includes assigning a weight to each weak classifier according to its ability to accurately differentiate between printable-character regions and b1 non-character regions; and
in step (ii), said first plurality of weak classifiers are selected from among the most accurate weighted weak classifiers corresponding to image feature characteristic statistics in categories not higher than said first category.

12. The method of claim 6, wherein in each of steps (ii), (iii) and (iv), IF in the construction of each of the level 1, level 2 and level 3 classifier sub-blocks:

the number of weak classifiers used in its construction is designated F, each weak classifier $h_f$ in its construction corresponds to a respective image feature characteristic statistic f where f=1 to F, and the total number of training sample pairs is designated P, THEN the constructing of each of the level 1, level 2 and level 3 classifier sub-blocks includes the following steps:

(I) Computing an initial weight $w_p$ for each of the P training sample pairs as follows, $$w_p = \frac{\text{area of training sample air } p}{\text{sum of the areas of all } P \text{ training sample pairs}}$$

(II) initializing an iteration counter t=0;

(III) computing classification error $\epsilon_{t,f}$ within current iteration t for each weak classifier $h_f$ for the all P training sample pairs, where $w_{t,p}$ denotes the weight of training sample pair p within current iteration t.

$$\epsilon_{t,f} = \sum_{p=1}^{P} w_{t,p} |(h_f(x_p) - y_p)|$$

where a classification of printable-character region is assigned a value of 1 and a classification of non-character region is assigned a value of −1, $h_f(x_p)$ indicates that weak classifier $h_f$ assigned a classification label $x_p$ to training sample pair p so that $h_f(x_p)$ is the computed classification value of training p sample p computed using weak classifier $h_f$ constructed for feature f, and $y_p$ is the true classification value of training sample p;

(IV) letting $\hat{h}_{t,f}$ denote the best weak classifier among all F weak classifiers $h_1$ to $h_F$, within current iteration t, $\hat{h}_{t,f}$ is defined as the weak classifier $h_f(x_p)$ that rendered the smallest classification error $\epsilon_{t,f}$ in step (III) as follows $$\hat{h}_{t,f} = \text{the } [h_f(x_p)] \text{ that rendered the minimum}(\epsilon_{t,f});$$

(V) updating the weights $w_{t,p}$ for each of the P training sample pairs as follows $$w_{t,p} = w_{t,p} \times \beta_t^{(1-e_p)}$$

$$e_p = \begin{cases} 0, & \hat{h}_{t,f}(x_p) = y_p \\ 1, & \text{otherwise} \end{cases}$$

where $$\beta_t = \frac{\epsilon_t}{1-\epsilon_t},$$

and $\epsilon_t$ is the average of all $$\epsilon_{t,f} \therefore \epsilon_t = \frac{\sum_{f=1}^{F} \epsilon_{t,f}}{F};$$

(VI) skipping to step (IX) if t=F;
(VII) incrementing t by 1;
(VIII) normalizing updated sample weights as follows $$w_{t,p} = \frac{w_{[(t-1),p]}}{\sum_{p=1}^{P} w_{[(t-1),p]}}$$

and returning to step (III);

(IX) defining the current classifier $\hat{h}(x)$ by combing select weak classifiers from among the best weak classifiers $\hat{h}_{t,f}$ of the past F iterations as follows:

$$\hat{h}(x) = \begin{cases} +1, & \sum_{t=1}^{F} \alpha_t \hat{h}_t(x) \geq \left(\frac{1}{2}\right) \sum_{t=1}^{F} \alpha_t, \quad \alpha_t = \log\left(\frac{1}{\beta_t}\right) \\ -1, & \text{otherwise.} \end{cases}$$

13. The method of claim 1, wherein in step (5), all test sample pairs not classified as printable-character regions by the level 1 classifier sub-block are discarded from further processing, and all test sample pairs not classified as printable-character regions by the level 2 classifier sub-block are discarded from further processing.

14. The method of claim 1, wherein in step (5), the level 2 classifier sub-block receives only test sample pairs that the level 1 classifier sub-block classifies as printable-character regions, and the level 3 classifier sub-block receives only the test sample pairs that the level 2 classifier sub-block classifies as printable-character regions.

15. A data processing device configured to implement the method of claim 1.

16. A computing device for identifying regions of an input image that contains human-readable, printable characters, said computing device comprising;
   an input for receiving said input image;
   a data processor to implement the following steps:
   (1) implementing a training phase including:
      (a) receiving a plurality of training regions havin foreround pixels, each training region being an example of a printable-character region or a non-character region;
      (b) for each received training region, constructing a connected components (CC) region for each training region by constructing connected components of the foreground pixels in each training region, each CC region and its corresponding training region from which it is constructed constituting a training sample pair;
      (c) for each training sample pair, computing a plurality of image feature characteristic statistics for each training sample pair, wherein each image feature characteristic statistic provides distinguishing information of each sample pair;
   (2) defining a character classifier processing block using said image feature characteristic statistics, said character classifier processing block including at least a level 1 classifier sub-block, a level 2 classifier sub-block and level 3 classifier sub-block, each classifier sub-block classifying a received image region as a printable-character region or as a non-character regions, wherein said level 2 classifier sub-block has a greater computational cost than said level 1 classifier sub-block, and said level 3 classifier sub-block has a greater computational cost than said level 2 classifier sub-block;

(3) extracting a plurality of test sample pairs from said input image, each test sample pair including a test image region of said input image and a test CC region constructed from the test image region;

(4) submitting said plurality of test sample pairs to said character classifier block, wherein:
the level 1 classifier sub-block receives for classification all of said plurality of test sample pairs;
the level 2 classifier sub-block receives for classification test sample pairs classified as printable-character regions by the level 1 classifier sub-block and does not receive any test sample pairs classified as non-character regions by the level 1 classifier sub-block; and
the level 3 classifier sub-block receives for classification test sample pairs classified as printable-character regions by the level 2 classifier sub-block and does not receive any test sample pairs classified as non-character regions by the level 2 or level 1 classifier sub-blocks; and (5) designating the test image regions of the test sample pairs classified as printable-character regions by the level 3 classifier sub-block as the regions of the input image that contain human-readable, printable characters.

17. The computing device of claim 16, wherein step (1) further includes the following step after step (c):

(d) grouping said image feature characteristic statistics into a plurality of categories according to their respective computational cost, wherein the image feature characteristic statistics in teach category have a similar computational cost, arranging said categories into a sequence of increasing computational cost.

18. The computing device of claim 17, wherein in step (2), the construction of said character classifier processing block including the following steps:

(i) constructing a separate weak classifier for each image feature characteristic statistic, wherein each weak classifier classifies an image region as a printable-character region or as a non-character regions based on the computed results of its corresponding image feature characteristic statistic;

(ii) constructing said level 1 classifier sub-block by combining a first plurality of weak classifiers corresponding to image feature characteristic statistics in categories not higher than in a first category in said sequence of increasing computational cost;

(iii) constructing said level 2 classifier sub-block by combining a second plurality of weak classifier corresponding to image features characteristic statistics in categories not higher than a second category in said sequence of increasing computational cost, said second category being higher than said first category in said sequence of increasing computational cost;

(iv) constructing said level 3 classifier sub-block by combining a third plurality of weak classifier corresponding to image features characteristic statistics in categories not higher than a third category in said sequence of increasing computational cost, said third category being higher than said second category in said sequence of increasing computational cost.

19. The computing device of claim 18, wherein:
said level 1 classifier sub-block combines weak classifiers corresponding to image feature characteristic statistics selectable from said first category and any other category below said first category in said sequence of increasing computational cost;
said level 2 classifier sub-block combines weak classifiers corresponding to image feature characteristic statistics selectable from said second category and any other category below said second category in said sequence of increasing computational cost; and
said level 3 classifier sub-block combines weak classifiers corresponding to image feature characteristic statistics selectable from said third category and any other category below said third category in said sequence of increasing computational cost.

20. The computing device of claim 18, wherein there are F image feature characteristic statistics, each image feature statistic is termed f, in turn, below where f=1 to F, and in step (i), the constructing of each separate weak classifier, $h_f$, includes the following steps applied to each image feature characteristic statistic f:

identifying the maximum (max) and minimum (min) value of image feature characteristic statistic f from step (c);
dividing the range of values, [min, max], into a fixed number of value intervals n;
adding a lower-boundary interval [−infinity to min] at the lower end of the value intervals and adding an upper-boundary internal [max to +infinity] at the upper end of the value intervals to create a total of n+2 value intervals;
defining a positive histogram comprised of the computed results from step (c) for image feature characteristic statistic f corresponding to training sample pairs defined from printable-character regions;
defining a negative histogram comprised of the computed results from step (c) for image feature characteristic statistic f corresponding to training sample pairs defined from non-character regions;
wherein said positive histogram and said negative histogram have a one-to-one correspondence between histogram value intervals, and each histogram has n+2 value intervals, the value intervals within the positive histogram of image feature characteristic statistic f being identifiable as $POS_f(j)$ where j=1 to (n+2), and the value intervals within the negative histogram of image feature characteristic statistic f being identifiable as $NEG_f(j)$ where j=1 to (n+2);
the defining of said positive histogram include, for each image feature characteristic statistic f corresponding to training sample pairs defined from printable-character regions, if the feature value lies in the jth interval, then $POS_f(j)=POS_f(j)+1$; and
the defining of said negative histogram include, for each image feature characteristic statistic f corresponding to training sample pairs defined from non-character printable regions, if the feature value lies in the jth interval, then $NEG_f(j)=NEG_f(j)+1$.

* * * * *